United States Patent
Boulay et al.

(10) Patent No.: US 11,566,925 B2
(45) Date of Patent: Jan. 31, 2023

(54) METHODS AND SYSTEMS FOR A WIRELESS MONITORING SYSTEM FOR A TANK

(71) Applicants: Worthington Cylinders Corporation, Columbus, OH (US); Otodata Wireless Network, Inc., Montreal (CA)

(72) Inventors: Andre Boulay, Ile Bizard (CA); Jason M. Gallovich, Dorval (CA); Adam Joseph Erwin, Columbus, OH (US); Michael Gaykowski, Worthington, OH (US); Simon Noel, Quebec (CA); Jennifer Marie O'Brian, Plain City, OH (US); Pascal Turcotte, Quebec (CA)

(73) Assignees: OTODATA WIRELESS NETWORK, INC., Montreal (CA); WORTHINGTON CYLINDERS CORPORATION, Columbus, OH (US)

(*) Notice: Subject to any disclaimer, the term of this patent is extended or adjusted under 35 U.S.C. 154(b) by 0 days.

(21) Appl. No.: 17/319,147

(22) Filed: May 13, 2021

(65) Prior Publication Data
US 2021/0262837 A1 Aug. 26, 2021

Related U.S. Application Data

(63) Continuation of application No. 16/736,048, filed on Jan. 7, 2020, now Pat. No. 11,047,714.
(Continued)

(51) Int. Cl.
*G01D 11/24* (2006.01)

(52) U.S. Cl.
CPC .................. *G01D 11/245* (2013.01)

(58) Field of Classification Search
CPC .................................... G01D 11/245
See application file for complete search history.

(56) References Cited

U.S. PATENT DOCUMENTS

| D256,088 S | 7/1980 | Gedye |
| D260,151 S | 8/1981 | Martinec |
(Continued)

FOREIGN PATENT DOCUMENTS

| CN | 3097501 | 1/1999 | |
| CN | 101077033 A | * 11/2007 | ............... H04Q 9/00 |
(Continued)

OTHER PUBLICATIONS

Worthington Industries, "SMARTLID Spec Sheet", Worthington Industries Website, 2021, URL:<https:// u worthingtonindustries. com/getmedia/c4bae261-?Sde-4959-8645-ec 78d2b9c3 7 d/35956 Smartlid_ Sei I_ Sheet_012221 _ V2>.
(Continued)

*Primary Examiner* — Jamel E Williams
(74) *Attorney, Agent, or Firm* — Tucker Ellis LLP

(57) ABSTRACT

The innovation described herein generally pertains to a system and method related a wireless remote monitoring system for a tank, wherein the wireless monitoring system is incorporated into or coupled to a lid for the tank. The wireless remote monitoring system for the tank can include a cover system that includes a lid mountable on a corresponding tank, the lid comprising a space sized and shaped for receiving the wireless remote monitoring system therein, wherein the wireless remote monitoring system is operatively coupled to a sensor.

20 Claims, 31 Drawing Sheets

Related U.S. Application Data

(60) Provisional application No. 62/852,192, filed on May 23, 2019.

(56) References Cited

U.S. PATENT DOCUMENTS

| | | | |
|---|---|---|---|
| 4,375,862 | A | 3/1983 | Kurinsky et al. |
| 5,085,340 | A | 2/1992 | Doxey et al. |
| D337,774 | S | 7/1993 | Schillinger |
| D343,629 | S | 1/1994 | Bode |
| D346,390 | S | 4/1994 | Sperling |
| D351,706 | S | 10/1994 | Breen |
| D381,162 | S | 7/1997 | Berend et al. |
| 5,894,953 | A | 4/1999 | Ramirez |
| D418,655 | S | 1/2000 | Conti |
| 6,225,599 | B1 | 5/2001 | Altekruse |
| 6,891,513 | B2 | 5/2005 | Kienzle |
| 6,998,575 | B1 | 2/2006 | Kensrue |
| D531,666 | S | 11/2006 | Kensrue |
| D555,446 | S | 11/2007 | Picaza Ibarrondo |
| D594,300 | S | 6/2009 | Picaza Ibarrondo |
| D609,774 | S | 2/2010 | Ryman |
| D617,459 | S | 6/2010 | Bogue |
| D638,270 | S | 5/2011 | Flattinger |
| D649,099 | S | 11/2011 | Nakamura et al. |
| D665,491 | S | 8/2012 | Goel et al. |
| D699,106 | S | 2/2014 | Glaser et al. |
| 8,720,738 | B1 | 5/2014 | Ryman |
| D735,002 | S | 7/2015 | Bondy |
| D753,431 | S | 4/2016 | Garman |
| D755,002 | S | 5/2016 | Garman |
| D756,280 | S | 5/2016 | Davito |
| D771,727 | S | 11/2016 | Imi |
| D807,108 | S | 1/2018 | Borovicka et al. |
| D876,914 | S | 3/2020 | Mitterhumer |
| D881,664 | S | 4/2020 | Vazquez |
| D882,361 | S | 4/2020 | Calandreli Cruz |
| D883,055 | S | 5/2020 | Vazquez |
| D893,967 | S | 8/2020 | Vazquez |
| D904,146 | S | 12/2020 | Grossauer |
| 2004/0020908 | A1 | 2/2004 | Centner |
| 2006/0219683 | A1 | 10/2006 | Kensrue |
| 2007/0164006 | A1 | 7/2007 | Burgstaller |
| 2008/0083061 | A1 | 4/2008 | Dubiel |
| 2008/0169289 | A1 | 7/2008 | Dawn |
| 2009/0152254 | A1 | 6/2009 | Giese |
| 2010/0037673 | A1 | 2/2010 | Wicht |
| 2010/0070208 | A1 | 3/2010 | Sai |
| 2010/0070209 | A1 | 3/2010 | Sai |
| 2010/0241369 | A1 | 9/2010 | Wicht |
| 2011/0024418 | A1 | 2/2011 | Batson |
| 2011/0062131 | A1 | 3/2011 | Binzel |
| 2011/0163910 | A1 | 7/2011 | Sai |
| 2011/0278316 | A1 | 11/2011 | Herzer et al. |
| 2012/0232777 | A1 | 9/2012 | Elkaim |
| 2013/0248085 | A1 | 9/2013 | Sugimoto |
| 2013/0261996 | A1 | 10/2013 | Perten |
| 2013/0269430 | A1 * | 10/2013 | Mauduit ............... G01S 13/88 73/290 V |
| 2014/0217096 | A1 | 8/2014 | Simpson |
| 2014/0246432 | A1 | 9/2014 | Yang et al. |
| 2016/0150899 | A1 | 6/2016 | Onza et al. |
| 2018/0304742 | A1 | 10/2018 | Maruthapillai |
| 2020/0010269 | A1 | 1/2020 | Copp |

FOREIGN PATENT DOCUMENTS

| | | | | |
|---|---|---|---|---|
| CN | 205518455 U | * | 8/2016 | |
| CN | 205553906 | | 9/2016 | |
| CN | 303984932 | | 12/2016 | |
| CN | 207991649 | | 10/2018 | |
| CN | 207991649 U | * | 10/2018 | |
| CN | 209684493 | | 11/2019 | |
| CN | 111377170 A | * | 7/2020 | |
| WO | 2009121169 | | 10/2009 | |
| WO | 2014145337 | | 9/2014 | |
| WO | WO-2014145337 A2 | * | 9/2014 | ............ A01K 61/85 |

OTHER PUBLICATIONS

International Search Report and Written Opinion, dated Jun. 23, 2020 in relation to International Application No. PCT/US2020/012541.

Search Report for Taiwan Design No. 109305021; dated Apr. 6, 2021; 4 pages.

* cited by examiner

METHODS AND SYSTEMS FOR A WIRELESS MONITORING SYSTEM FOR A TANK

CROSS-REFERENCE TO RELATED APPLICATIONS

This U.S. patent application claims priority to and is a continuation patent application of U.S. patent application Ser. No. 16/736,048 filed on Jan. 7, 2020. U.S. patent application Ser. No. 16/736,048 is a non-provisional patent application and claims priority to U.S. Provisional Patent Application Ser. No. 62/852,912 filed on May 23, 2019 entitled "SMART COVER FOR A TANK." The entireties of the aforementioned applications are incorporated herein by reference.

TECHNICAL FIELD

In general, the subject innovation relates to covers for tanks, and more particularly to a cover system for a tank comprising a wireless remote monitoring system.

BACKGROUND

Tanks come in all sizes and shapes, and are made from a variety of materials to store a variety of contents. Conventionally, methods and systems utilize a manual check of volume level to determine if more contents need to be added to the tank. This can be cumbersome due to traveling to each location to manually check when some tanks may not need filled.

There is a need for a method or system to overcome the inefficiencies related to manual servicing of tanks.

SUMMARY

In accordance with a further embodiment of the subject innovation, a cover system is provided. The cover system for the tank can include at least the following: a lid having a shape that includes a top face, a bottom face opposite the top face, and a peripheral side flange extending on a periphery of the lid on the bottom face thereof; the lid includes a latch on a location on the peripheral side flange and a lid hinge member opposite to the location of the latch; the lid is a mountable on a periphery of a top collar of a tank, wherein the lid attaches to the top collar of the tank with the lid hinge member attaching to a corresponding hinge on the top collar; the lid hinge member mating with the hinge enables an open state for the lid on the tank and a closed state for the tank, wherein the closed state protects at least one of a valve, a gauge, or a pressure relief valve positioned on a top end of the tank within the top collar; a wireless remote monitoring system contained within a housing, the housing releasably coupled to the bottom face of the lid, the wireless remote monitoring system further includes: a sensor coupled to the tank or within the tank, the sensor detects at least one of a volume of contents within the tank, a geographic location of the tank, a duration of time for the lid in the open state, and a flow in and out of the tank; a transmitter that wirelessly communicates the volume of contents within the tank, the geographic location of the tank, the duration of time for the lid in the open state, and the flow in and out of the tank; a receiver; a battery that powers at least one of the sensor, the receiver, or the transmitter; and the housing is positioned above a plane defined by the periphery of the top collar of the tank to facilitate wirelessly communicating to and from the cover system.

In accordance with another embodiment, the cover system can include at least one of the the following: a tank having a top end, a bottom end opposite the top, a sidewall in between the top end and the bottom end, the tank configured to hold a volume under a pressure; a sensor coupled to the tank, the sensor tracks a temperature of the tank, an amount of force taken by the tank, a geographic location of the tank, and a volume of the tank; a wireless remote monitoring system that wirelessly receives data from the sensor, the sensor communicates a first data package that includes the temperature, the amount of force, the geographic location of the tank, and the volume of the tank; the wireless remote monitoring system creates a second data package that includes a time stamp of when the first data package was communicated, an identification of the wireless remote monitoring system, and the first data package; and a monitor component that is configured to: receive of the second data package; evaluate of the time stamp from the wireless remote monitoring system; monitor the temperature, the amount of force, the geographic location of the tank, and the volume of the tank; communicate data to the sensor via the wireless remote monitoring system; and communicate a notification if at least one of the temperature, the amount of force, and the volume of the tank exceeds a predefined threshold.

According to a broad aspect, there is disclosed a cover system for a tank, comprising a lid mountable on a corresponding tank, the lid comprising a space sized and shaped for receiving a wireless remote monitoring system therein, wherein the wireless remote monitoring system is operatively coupled to a sensor for sensing a level of a content contained in the corresponding tank and for generating a corresponding sensor level signal representative of the level of the content contained in the corresponding tank, further wherein the wireless remote monitoring system receives the sensor level signal from the sensor and generates a corresponding signal wirelessly transmitted to a third party.

In accordance with an embodiment, the content is a fluid. In accordance with an embodiment, the fluid is fuel. In accordance with an embodiment, the cover system comprises the wireless remote monitoring system therein. In accordance with another embodiment, the wireless remote monitoring system comprises a communication module port adapted for receiving a communication module card therein and the lid comprises an opening for accessing the communication module port. In accordance with an embodiment, the lid comprises a battery operatively coupled to the wireless remote monitoring system. In accordance with another embodiment, the lid further comprises on a top face thereof a solar panel operatively coupled to any one of the battery and the wireless remote monitoring system. In accordance with an embodiment, the lid has an external convex shape and an internal concave shape.

In accordance with an embodiment, the cover system further comprises an attaching means for attaching the lid to the tank. In accordance with an embodiment, the attaching means comprises a pivoting means for pivoting the lid relative to the tank. In accordance with an embodiment, the pivoting means comprises a hinge. In accordance with an embodiment, the lid further comprises a locking means for locking the lid to the tank. In accordance with an embodiment, the locking means comprises a biasing means for biasing the locking means towards the tank. In accordance with an embodiment, the cover system further comprises a cable for operatively coupling the sensor to the wireless remote monitoring system. In accordance with an embodiment, the cover system is made of any one of plastic, metal, and fiberglass. In accordance with an embodiment, the tank is a fuel tank.

These and other objects of this innovation will be evident when viewed in light of the drawings, detailed description and appended claims.

BRIEF DESCRIPTION OF THE DRAWINGS

The innovation may take physical form in certain parts and arrangements of parts, a preferred embodiment of which will be described in detail in the specification and illustrated in the accompanying drawings which form a part hereof, and wherein.

DETAILED DESCRIPTION

Figure 1:
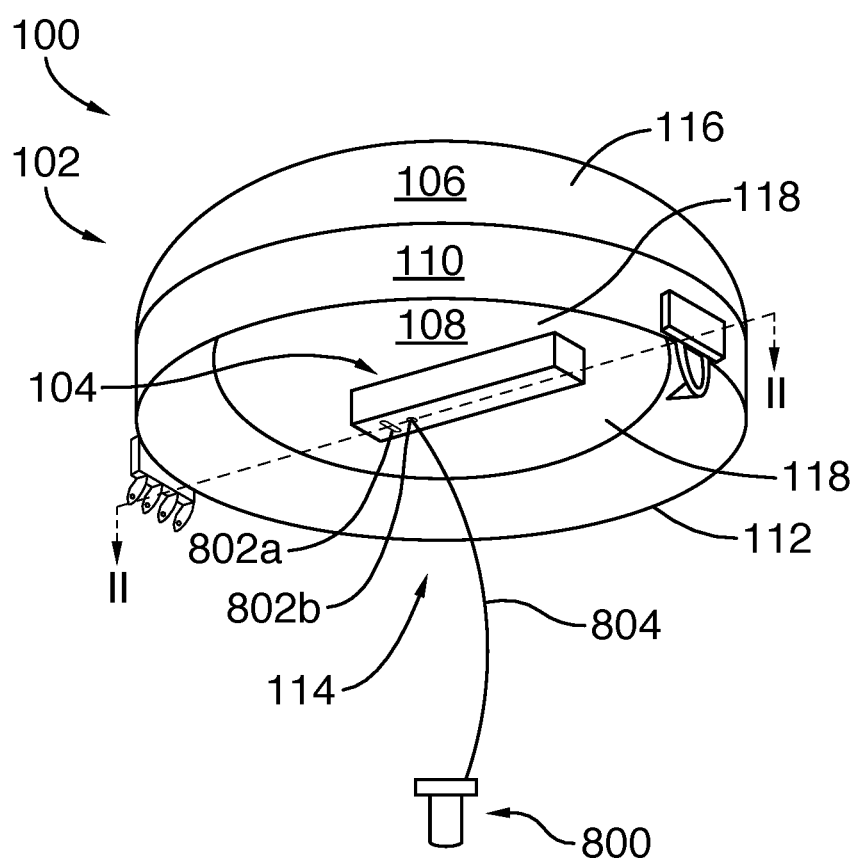
FIG. 1 is a bottom, left-side, perspective view of a cover system for a tank, the cover system comprising a lid sized and shaped for receiving a wireless remote monitoring system therein and a sensor operatively coupled to the wireless remote monitoring system in accordance with one embodiment.

Embodiments of the innovation relate to methods and systems that relate to a cover system that releasably couples to a container or tank, wherein the cover system can protect one or more features thereof from natural elements as well as physical impact or wear and tear. The cover system can further include one or more components to detect, monitor, and one or more parameters related to at least one of the tank or container, the environment or location of the tank or container, the contents of the tank or container, among others.

Monitoring systems for containers are useful for monitoring a characteristic of a content contained in the container or tank and for reporting the corresponding information collected to a third party without necessarily requiring a physical presence at the geographic location of the container or tank.

In particular, fluid-monitoring systems used for monitoring a level of a fluid in a tank are useful to ensure that a specific minimum level of fluid is maintained in the tank. The monitoring will help ensure that the tank is refilled only when needed, therefore ensuring that the tank never gets completely depleted as well as maximizes efficient use of employees, equipment, and resources. This will also prevent an unnecessary routine refilling or inspection of the tank by a fluid provider.

Fluid-monitoring systems can also be exposed to harsh environmental conditions, e.g. snow, rain, UV-exposition, etc., but also subject to physical damages by bystanders or by the operation of equipment in vicinity of the tanks, e.g. a lawnmower or any other equipment susceptible to accidently damage fluid-monitoring systems.

The term "component" as used herein can be defined as a portion of hardware, a portion of software, or a combination thereof. A portion of hardware can include at least a processor and a portion of memory, wherein the memory includes an instruction to execute. The term "container" or "tank" as used herein can be defined as any cylinder, housing, canister, and the like of any suitable material that can house or contain at least one of a liquid, gas, solid, such as, but not limited to, a propane, a compressed natural gas, a gasoline, a hydrogen, a liquid nitrogen, an alternative fuel, a renewable fuel source, a nonrenewable fuel source, a liquid fuel source, or a gas fuel source.

While the embodiments discussed herein have been related to the systems and methods discussed above, these embodiments are intended to be exemplary and are not intended to limit the applicability of these embodiments to only those discussions set forth herein. The embodiments and discussions herein can be readily incorporated into any of these systems and methodologies by those of skill in the art.

With reference to the drawings, like reference numerals designate identical or corresponding parts throughout the several views. However, the inclusion of like elements in different views does not mean a given embodiment necessarily includes such elements or that all embodiments of the innovation include such elements. The examples and figures are illustrative only and not meant to limit the innovation, which is measured by the scope and spirit of the claims.

With all this in mind, the subject disclosure is directed to a cover system 100 for a tank. The cover system 100 comprises a lid 102. The lid 102 is sized and shaped for receiving a wireless remote monitoring system 104. In an embodiment, the wireless remote monitoring system 104 can be operatively coupled to a sensor 800 that is configured to detect one or more parameters related to the tank 300, the contents of the tank 300, or the environment of the tank 300 such as, but not limited to a level or quantity of contents in a container or tank on which the lid 102 releasably couples or is affixed.

Figure 2:
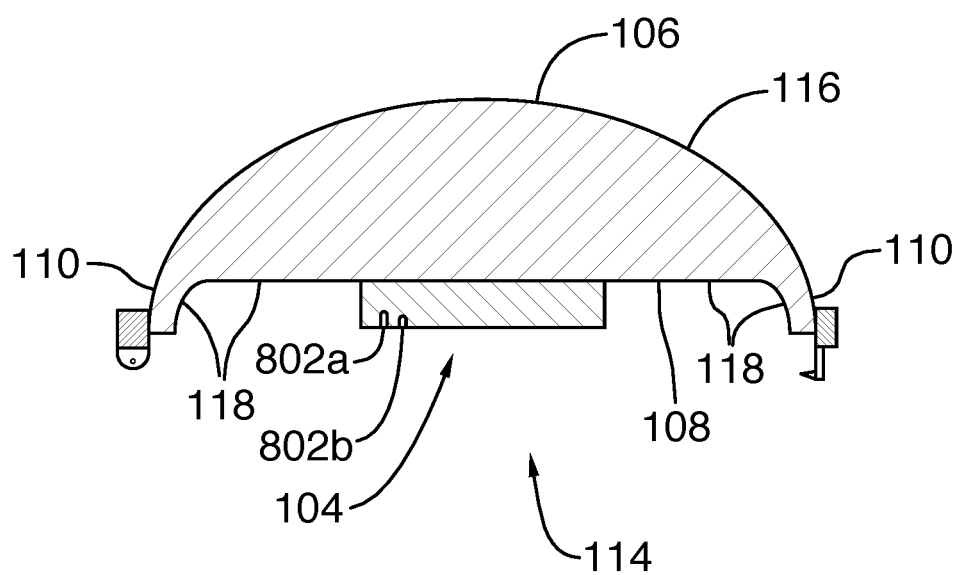
FIG. 2 is a left-side cross-sectional view of the cover system illustrated in FIG. 1 taken along plane II-II of FIG. 1.

FIGS. 1 and 2 depict the lid 102 having a general circular shape and comprising a top face 106, a bottom face 108, and a peripheral side flange 110 extending on a periphery 112 of the lid 102, on the bottom face 108 thereof. Together with a peripheral side flange 110, the bottom face 108 of the lid 102 defines a space 114. It will be appreciated that the space 114 of the lid 102 is directed towards a corresponding tank 300 when the cover system 100 is mounted thereon, and the space 114 is sized and shaped for receiving the wireless remote monitoring system 104 therein.

It is to be appreciated that the lid 102 can be a geometric shape that can be configured to couple to a container or tank, wherein the geometric shape can be, but not limited to, circular, oval, round, square, pentagon, rectangle, hexagon, polygon, triangle, among others. The lid 102 can be further fabricated from a material such as, but not limited to, metal, plastic, aluminum, a polymer, a composite material (e.g., a combination of metal with plastic, etc.), chrome, nickel, among others. It is to be appreciated that fabricating the lid 102 can be performed by any suitable technique having a shape and a material and such can be chosen with sound engineering judgment without departing from the intended scope of coverage of the embodiments of the subject innovation. For example, the forming of lid 102 can be from injection molding having a shape made from plastic. In still another example, the lid 102 can be made from metal with a shape.

It will be appreciated that in an embodiment, the top face 106 of the lid 102 can have a convex shape 116 while the bottom face 108 can have a concave shape 118 that may or not include a substantially flat portion so that the space 114 may be defined by the peripheral side flange 110 and the concave shape 118 of the bottom face 108 of the lid 102. It is to be appreciated that the top face 106 and the bottom face 108 need not be convex shape 116 or concave shape 118 respectively and such top face 106 and bottom face 108 can have various geometric shapes to define the space 114 so long as such space 114 can house or contain one or more components related to at least the wireless remote monitoring system 104.

It will be appreciated that the wireless remote monitoring system 104 may be received anywhere within the space 114 of the lid 102 using various methods, known to the skilled addressee, such as affixing, fastening, or securing the wireless remote monitoring system 104 to the bottom face 108 of the lid 102 by any means known in the art such as for instance screws, glue, female part that mates with male part, snap fittings, adhesive, nut and bolts, magnetic system with a magnet or metal portion on a location on the lid 102 and a magnet or metal portion on the wireless remote monitoring system 104, etc. For example, a magnet can be located on or in a portion of the lid 102 that allows removeable connectivity to a portion of the wireless remote monitoring system 104, wherein such connectivity is between the magnet and an additional magnet in or on the wireless remote monitoring system 104 or a material that magnetizes with the magnet. In another example, a magnet can be located on or in a portion of the wireless remote monitoring system 104 that allows removeable connectivity to a portion of the lid 102, wherein such connectivity is between the magnet and an additional magnet in or on the lid 102 or a material that magnetizes with the magnet.

It is to be appreciated that the wireless remote monitoring system 104 can be incorporated into the lid 102 or a portion of the lid 102, affixed to the lid 102 at a location, a stand-alone component(s) attachable to the lid 102, or any a combination thereof. In addition, the wireless remote monitoring system 104 can be on a location of the lid 102 such as, but not limited to, on an outside of the peripheral side flange 110, on an inside of the peripheral side flange 110, on the bottom face 108, on the top face 106, or a combination thereof. For example, one or more components of the wireless remote monitoring system 104 can be incorporated into the lid 102 or affixed to the lid 102 and such one or more components need not be in the same location of the lid 102 or incorporated together.

Figure 3:
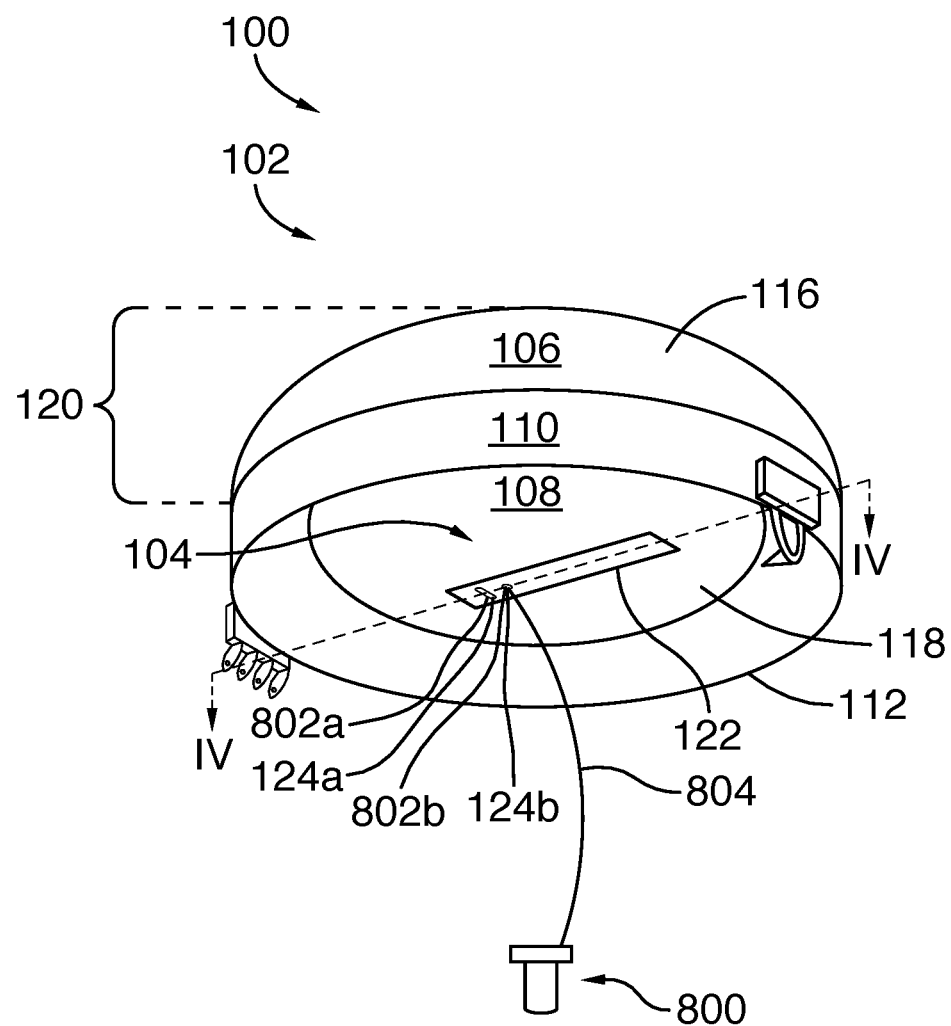
FIG. 3 is a bottom, left-side, perspective view of a cover system for a tank, the cover system comprising a lid having a recess space sized and shaped for receiving a wireless remote monitoring system therein and a sensor operatively coupled to the wireless remote monitoring system in accordance with another embodiment.
Figure 4:
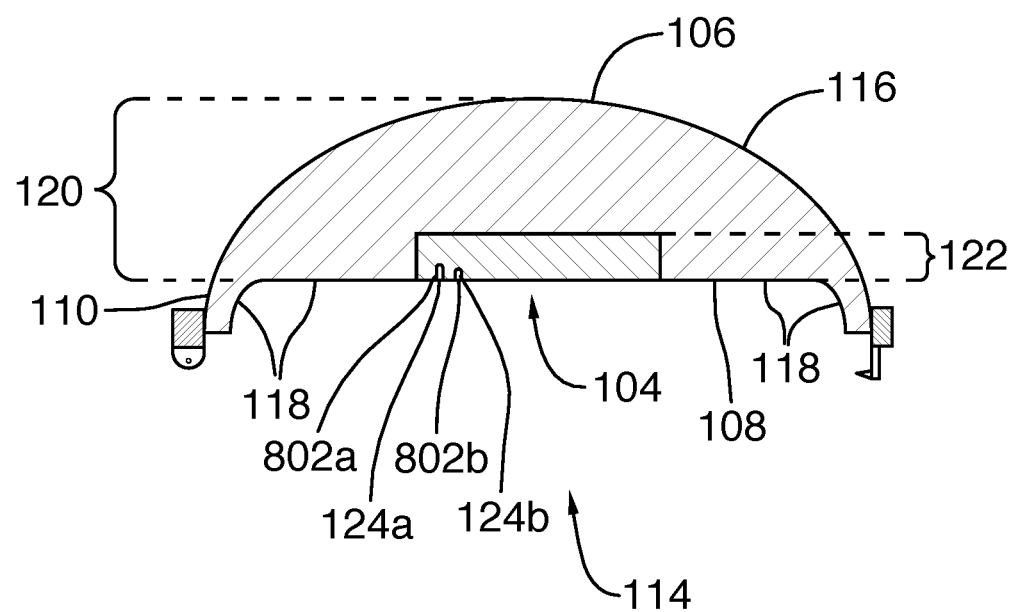
FIG. 4 is a left-side cross-sectional view of the cover system illustrated in FIG. 3 taken along plane Iv-Iv of FIG. 3.

In another embodiment, shown in FIGS. 3 and 4, the top face 106 and the bottom face 108 of the lid 102 defines together a thickness 120 comprising a recess space 122 sized and shaped for receiving the wireless remote monitoring system 104 therein. In such embodiment, the wireless remote monitoring system 104 may be affixed, fastened, or secured into the recess 122 according to various embodiments such as by interference fit of the wireless remote monitoring system 104 with the lid 102, by the wireless remote monitoring system 104 fittingly cooperating with the lid 102, or by any other means known to the skilled addressee, such as for instance using screws, glue, female part that mates with male part, snap fittings, adhesive, nut and bolts, magnetic system with a magnet or metal portion on a location on the lid 102 and a magnet or metal portion on the wireless remote monitoring system 104, etc.

It will be appreciated that in one embodiment wherein the wireless remote monitoring system 104 is received into the recess space 122, the wireless remote monitoring system 104 may be partially covered or totally covered by the bottom face 108 of the lid 102, such that the wireless remote monitoring system 104 is embedded or integrated within the lid 102 and form a one-piece construction with the lid 102. It will be appreciated that in another embodiment, the bottom face 108 of the lid 102 may have at least one optional opening, such as openings 124a and 124b, for providing an access to one or more components of the wireless remote monitoring system 104. In another embodiment, the wireless remote monitoring system 104 is received into the recess space 122 with no access provided to it such as self-contained.

The skilled addressee will appreciate that the embedding or integration of the wireless remote monitoring system 104 within the lid 102 of the cover system 100 can provide protection against physical damages e.g. the lid 102, when made of a material such as, but not limited to, an elastically resilient material such as a polymers, may protect the wireless remote monitoring system 104 by absorbing the energy of direct force impacts applied to the smart cover 100 and against environmental conditions e.g. by substantially isolating the wireless remote monitoring system 104 from humidity. In another example, the cover system 100 can protect from moisture, rain, high winds, hail, snow, sleet, falling debris (e.g., tree branches, leaves, etc.), animal damage (e.g., nest building, chewing or eating of components, wires, or connectors, etc.), among others.

Figure 5:
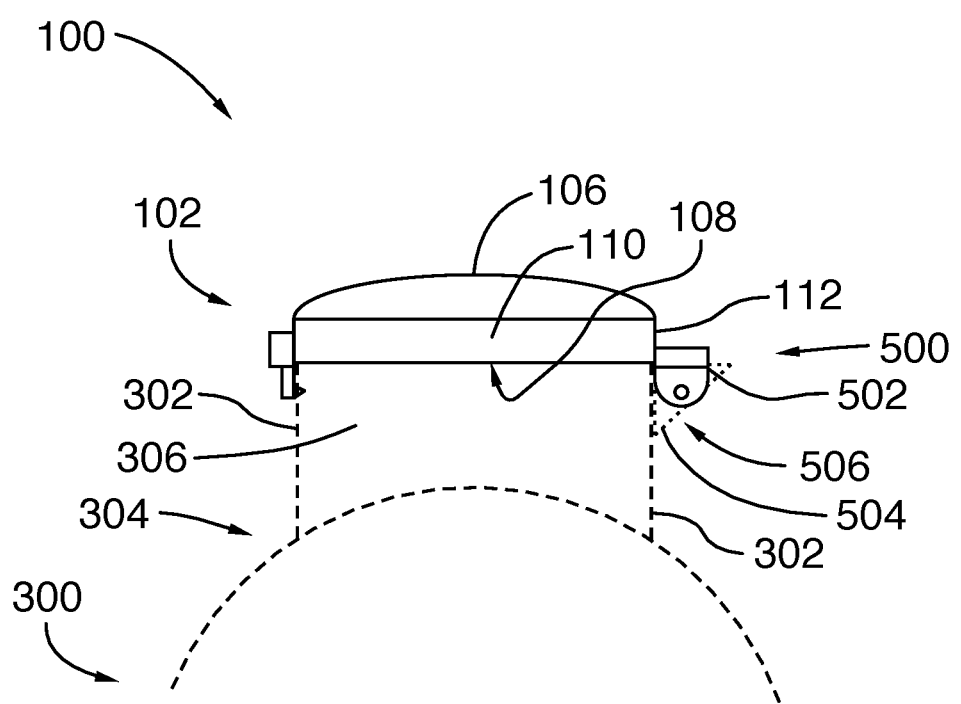
FIG. 5 is a right-side, elevation view of the cover system shown in FIG. 1 and mounted on a corresponding tank, the cover system being in a close state relative to the corresponding tank.
Figure 6:
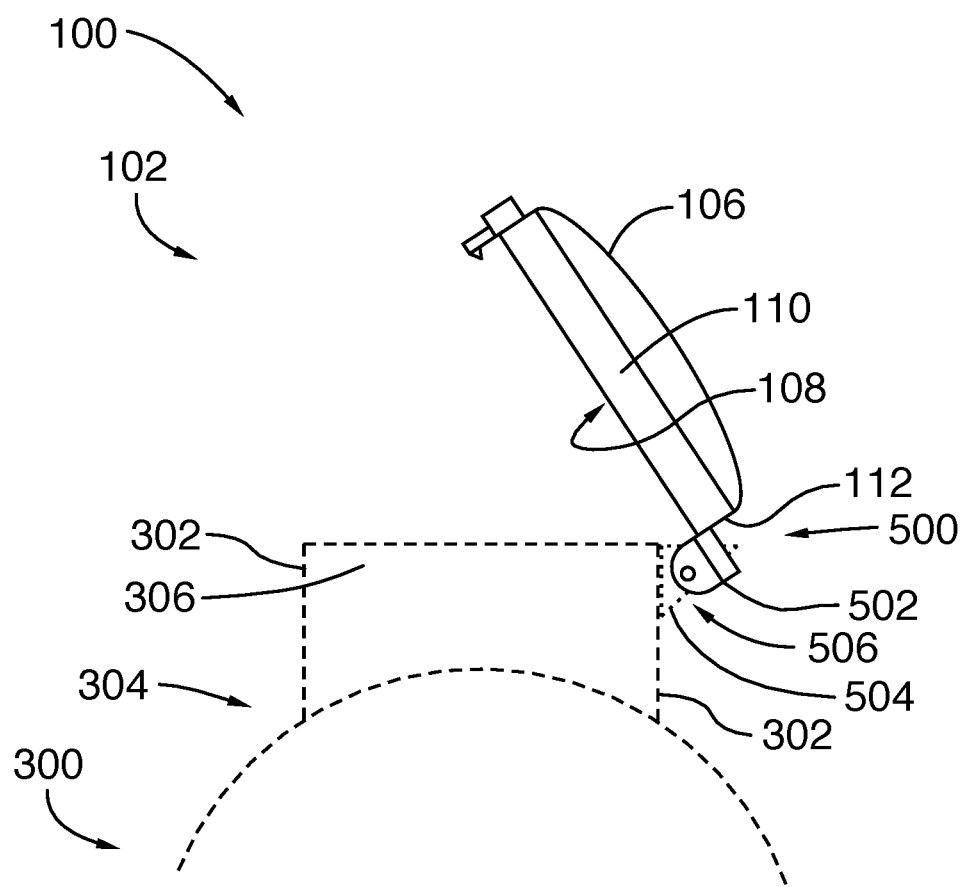
FIG. 6 is a right-side, elevation view of the cover system shown in FIG. 5 that is mounted on a corresponding tank, the cover system being in an open state.
Figure 21:
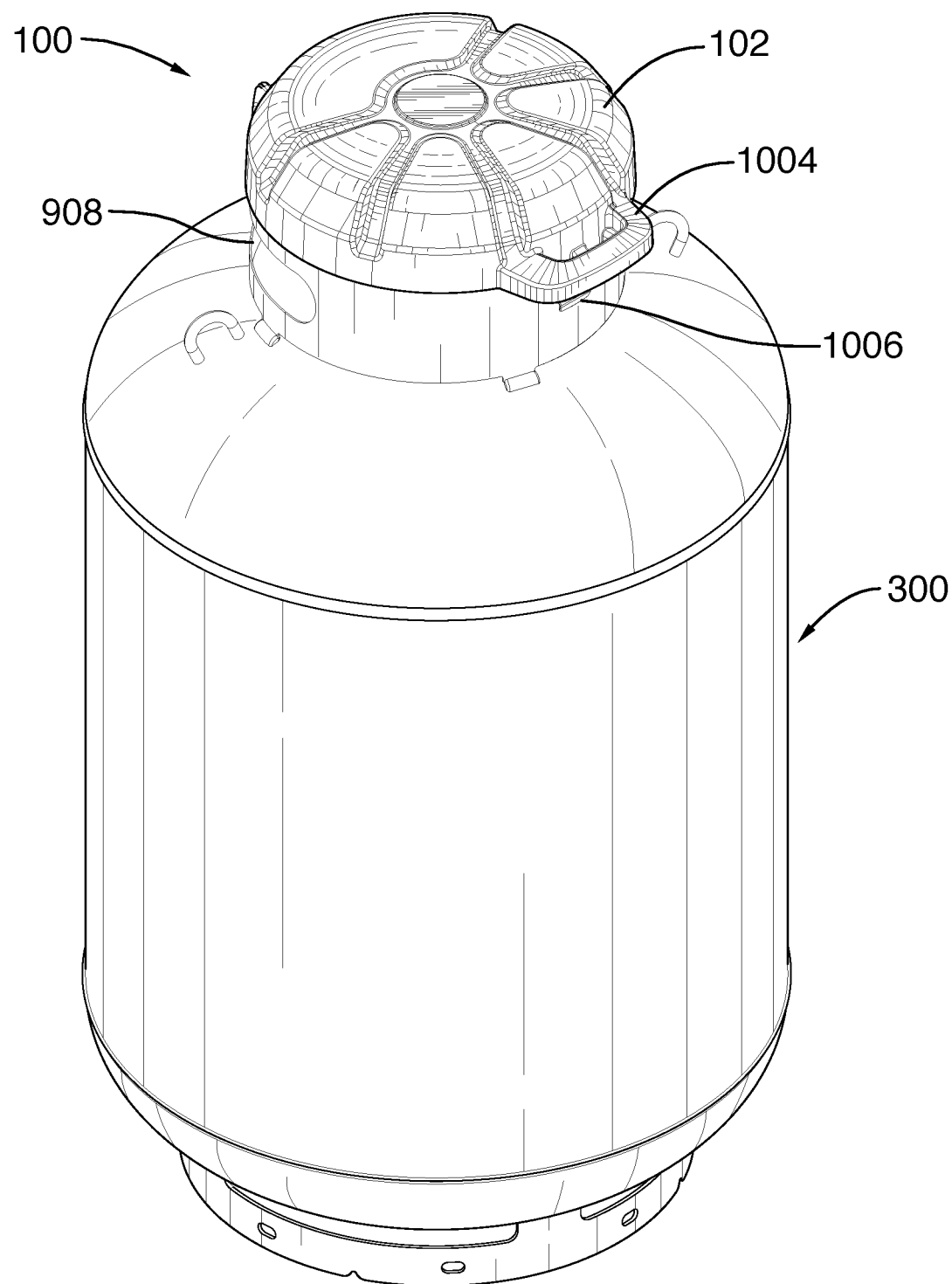
FIG. 21 illustrates a tank with the cover system attached thereto in a closed state.
Figure 22:
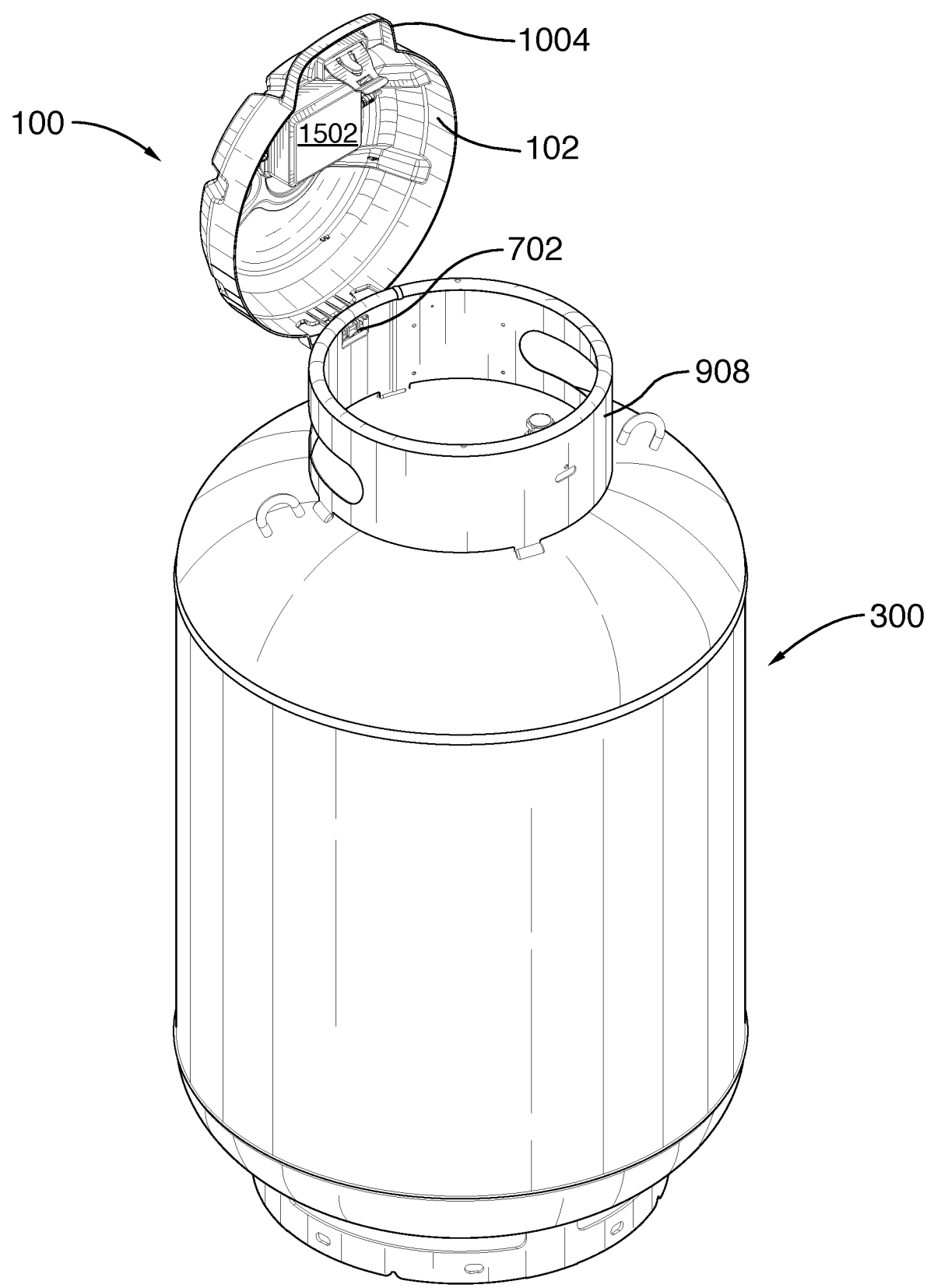
FIG. 22 illustrates a tank with the cover system attached thereto in an open state.

Now referring to FIGS. 5 and 6, it will be appreciated that the cover system 100 may be mountable on a tank 300 or any other container, and may also be configurable thereto between a close state illustrated in FIG. 5 (also shown at FIG. 21) and an open state illustrated in FIG. 6 (also shown in FIG. 22) relative to the tank 300. It is to be appreciated that the lid 102 can be moveable between the open state and the closed state with an amount of degrees measured from the periphery 112 of the lid 102 such that the range of motion can be from zero (0) degrees (relative to the plane of a top of a peripheral sidewall 302) to more than 210 degrees, where the 210 degrees is limited to the lid 102 coming into contact with the tank 300. It is to be further appreciated that the number of degrees from the open state to the closed state can be limited or selected by sound engineering and such range of degrees is intended to be within the scope of this subject innovation.

More particularly, the cover system 100 is mountable on a peripheral sidewall 302 extending upwardly from a top portion 304 of the tank 300 so that the peripheral side flange 110 of the lid 102 abuts to or overlaps with the peripheral sidewall 302 of the tank 300. While mounted on the tank 300 in the close state, the lid 102 can define together with the peripheral sidewall 302 and the top portion 304 of the tank 300 a close space 306 adapted for housing and protecting one or more components.

It will be appreciated by the skilled addressee that in an embodiment the tank 300 contains a solid material, a fluid such as a fuel, or a combination of solid and fluid materials therein.

The skilled addressee will further appreciate that the cover system 100, along with the close space 306 defined by the lid 102 in a closed state, the peripheral sidewall 302 and the top portion 304 of the tank 300, may provide protection for not only the wireless remote monitoring system 104 and sensitive components thereof (e.g. the sensor 800, battery, cable, etc.), but also the sensitive equipment components or features of the tank 300 itself (e.g. the valve(s) and the gauge(s)). As such, the cover system 100 may provide protection, for example, against environmental conditions (e.g. rain, snow, ice, prolonged UV exposition, etc.) and/or against physical damages caused by bystanders or by equipment operation in vicinity of the tank 300. When equipped with a wireless transmitter, the cover system 100 may also improve the wireless transmission performance of the wireless remote monitoring system 104 by locating the wireless remote monitoring system 104 at the highest point above ground on the tank 300 and by protecting an antenna from snow and/or ice accumulation, which, if present, may reduce the performance of the wireless transmission.

Still referring to FIGS. 5 and 6, it will be appreciated that the cover system 100 may further comprise a lid attaching means 500 configured for attaching the lid 102 to the tank 300. The lid 102 can be releasably coupled to a portion of the tank 300 or permanently attached to a portion of the tank 300. In one embodiment, the lid attaching means 500 includes a lid portion 502, located on the periphery 112 of the lid 102 that is attachable to a corresponding tank portion 504, located on the peripheral sidewall 302 of the tank 300, of a tank attaching means 506 on the tank 300. Furthermore, it will be appreciated that the lid portion 502 may be removably or permanently attachable to the corresponding tank portion 504 so that the smart cover 100 may or may not be removably attachable to the tank 300.

Figure 7:
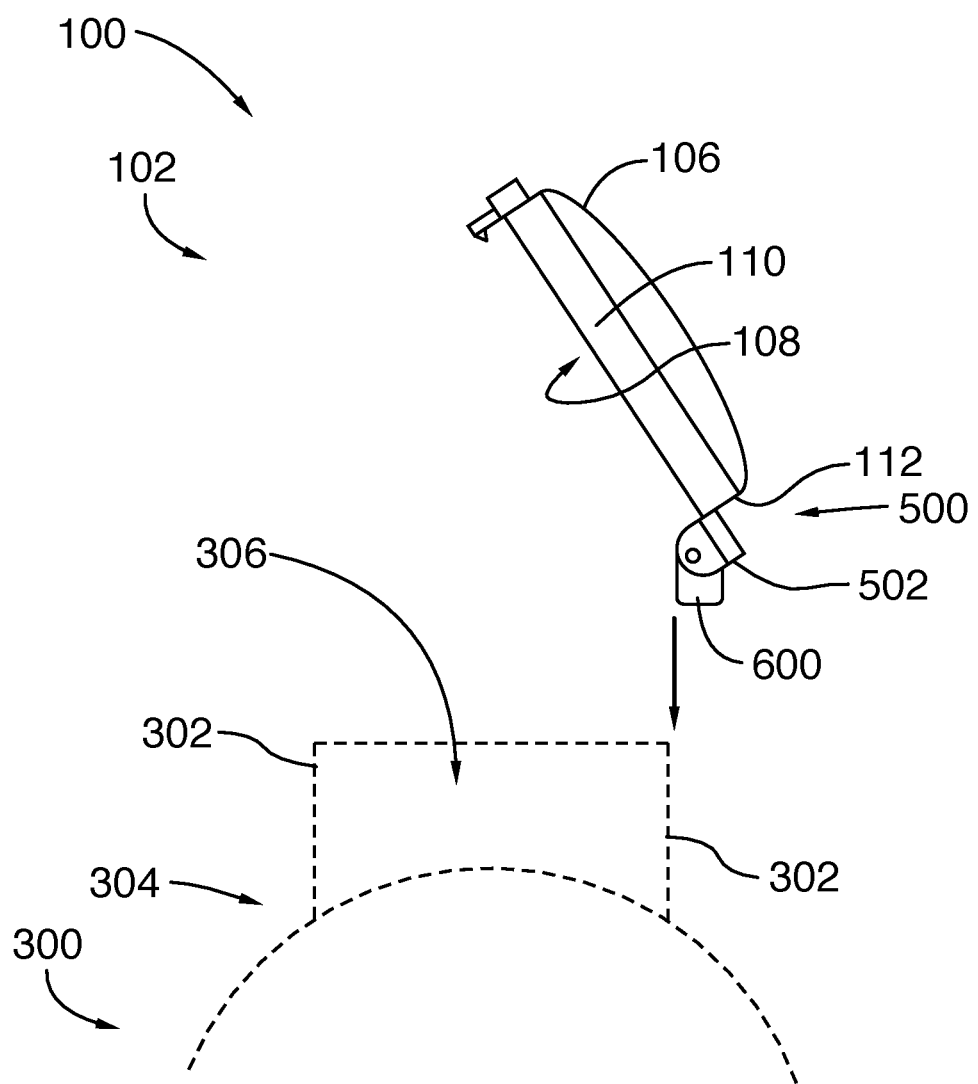
FIG. 7 is a right-side, elevation view of a cover system for a tank mounted on a corresponding tank, the cover system comprising a lid attaching means having two lid portions for attaching the cover system on the corresponding tank, in accordance with one embodiment.

In one embodiment shown in FIG. 7, the tank 300 does not have a tank attaching means 506, including the tank portion 504 on the tank 300. In such case, the lid attaching means 500 of the smart cover 100 further includes, in addition to the lid portion 502, a second lid portion 600 that is removably or permanently attachable to the peripheral sidewall 302 of the tank 300 by screw(s), rivet(s), welding, clipping mechanism, and/or any other means known to the skilled addressee. As described before for the lid portion 502 and the tank portion 504, the lid portion 502 may also be removably or permanently attachable to the second lid portion 600 so as the cover system 100 may or may not be removably attachable to the tank 300.

Figure 8:
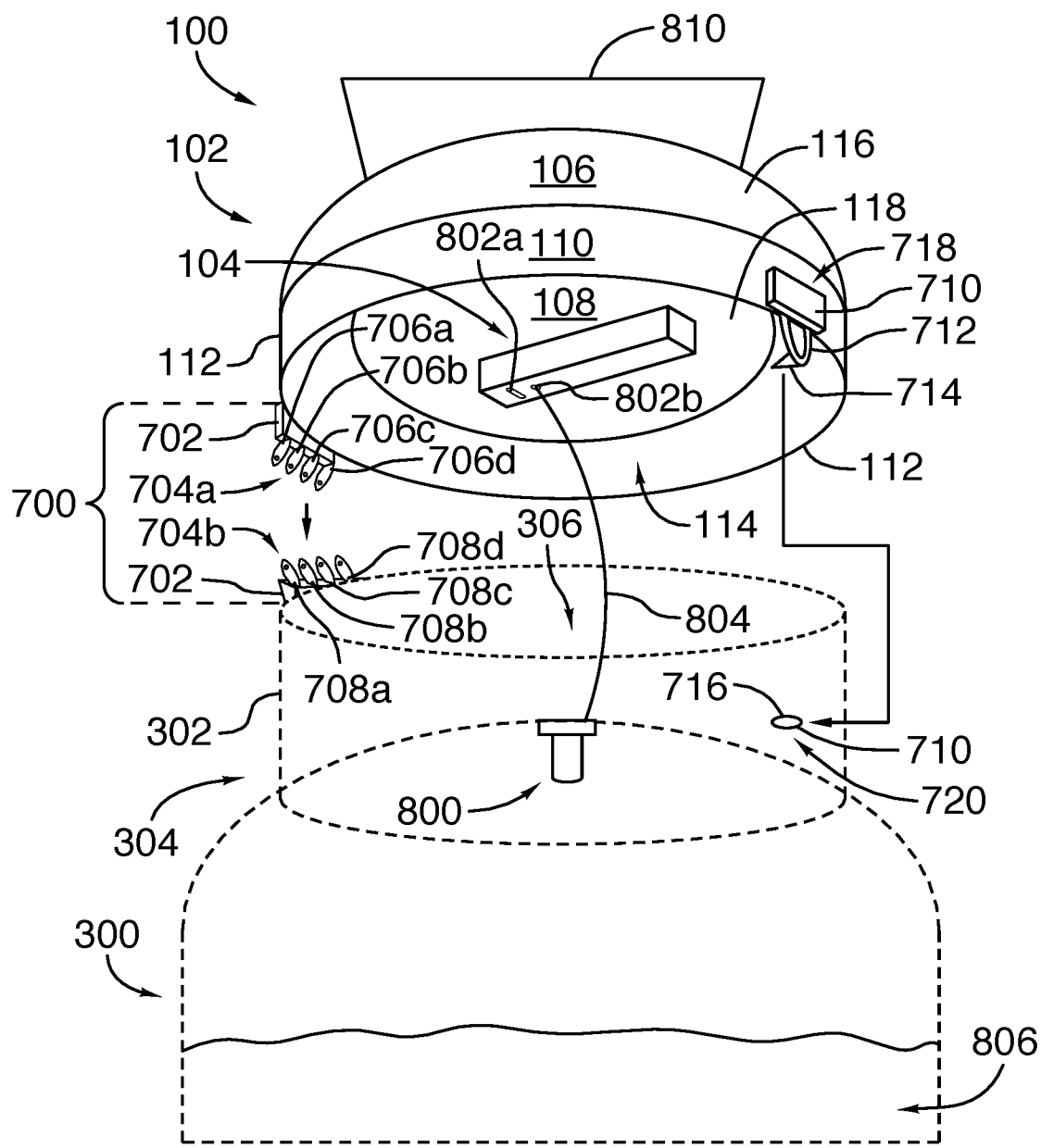
FIG. 8 is a bottom, left-side, perspective view of a cover system for a tank and a corresponding tank, the cover system being mounted on the corresponding tank, the cover system comprising a lid sized and shaped for receiving a wireless remote monitoring system therein, a sensor, a cable operatively connecting the wireless remote monitoring system and the sensor, and a solar panel, in accordance with another embodiment.

Any one of the lid portion 502, shown in FIGS. 5 and 6, and the second lid portion 600, shown in FIG. 7, of the lid attaching means 500 as well as the tank portion 504, shown in FIGS. 5 and 6, of the tank attaching means 506, further comprise pivoting means 700 configured for enabling a pivoting of the smart cover 100 between the close state illustrated in FIG. 5 and the open state illustrated in FIG. 6 relative to the tank 300. As illustrated in FIG. 8, the pivoting means 700 comprises a hinge 702 having a lid hinge member 704a corresponding to the lid portion 502 and a tank hinge member 704b corresponding to the tank portion 504 or the second lid portion 600. The lid hinge member 704a comprises in one embodiment four perforated tabs 706a, 706b, 706c, and 706d, each projecting downwardly from the peripheral side flange 110 on the outside of the periphery 112 of the lid 102. It is to be appreciated that the number of tabs can be chosen with sound engineering without departing from the scope of the subject innovation and such number of tabs is to be included within this subject innovation. The tank hinge member 704b also comprises four perforated tabs 708a, 708b, 708c, and 708d, each projecting upwardly from the outside of the peripheral sidewall 302 of the tank 300. To pivotally attach the lid hinge member 704a to the tank hinge member 704b, the perforated tabs 706a, 706b, 706c, and 706d and the perforated tabs 708a, 708b, 708c, and 708d, respectively, each receive in corresponding perforations a transversal pin. The skilled addressee will appreciate that various alternative embodiments may be possible for the pivoting means 700.

Still referring to FIG. 8, it will be appreciated that the cover system 100 may further comprise an optional locking means 710 adapted for locking the cover system 100 to the tank 300 while the lid 102 is in the close state. The optional locking means 710 comprises a lid portion 718 located on the lid 102 and a tank portion 720 located on the tank 300. More precisely, the lid portion 718 is located on the peripheral side flange 110 on the outside of the periphery 112 of the lid 102 and may be diametrically opposed to the hinge 702 of the cover system 100. The lid portion 718 of the locking means 710 may include a handle 712 having a tip 714 and a biasing element. The handle 712 projects downwardly from the peripheral side flange 110 of the lid 102 and terminates with the tip 714. Located on the distal part of the handle 712 relative to the lid 102, tip 714 projects generally parallel to a plane defined by the lid 102 and towards the center of the lid 102. In such configuration, the biasing element biases the handle 712 and tip 714 towards the center of the lid 102. In an embodiment, the locking of the cover system 100 can be locked and unlocked with at least one of physical, electrical, biometrics, or a combination thereof. For example, a key fab can provide a digital signature wirelessly to the cover system 100 in which a digital lock can receive such digital signature for unlocking or locking.

The cover system 100 is locked to the tank 300 by the action of the biasing element that urges and engages the tip 714 of the locking means 710 into a corresponding aperture 716 located on the peripheral sidewall 302 of the tank 300. It will be appreciated that in this embodiment a force must be applied to the handle 712 in a direction opposed to the force exerted by the biasing element so as to disengage the tip 714 from the aperture 716 of the peripheral wall 302 of the tank 300 and accordingly unlock the cover system 100 from the tank 300. The cover system 100 may then be pivoted away from the tank 300 in order to access the close space 306. To lock the cover system 100 back to the tank 300, a force may be applied to the handle 712 in a direction opposed to the force exerted by the biasing element, the cover system 100 can be pivoted towards the tank 300, the tip 714 can align with the aperture 716, and then the force applied to the handle 712 in a direction opposed to the force exerted by the biasing element is release in order for the 714 tip to engage with and be maintained in the aperture 716 by the action of the biasing element.

In one embodiment, the biasing element may be made of an elastically resilient material, such as a polymer, and may further comprise a coil spring or any other means known in the art.

While in the embodiments previously disclosed the cover system 100 and the lid 102 may have a round, oval, and/or curved shape, it will be appreciated by the skilled addressee that in other embodiments, the cover system 100 and the lid 102 may have any other suitable size or shape.

It will be further appreciated that the lid 102 of the cover system 100 may be made of a material selected from a group comprising polymer, plastic, metal, fiberglass and/or any other suitable material known in the art. Moreover, it will be appreciated that the lid 102 of the cover system 100 may be manufactured by various techniques selected from a group consisting of injection molding, 3D printing, CNC machining, welding, or any other suitable manufacturing technique known in the art.

The wireless remote monitoring system 104 may comprise any number of communication port(s) adapted for connecting components, devices, add-ons, and/or the like (e.g. batteries, antenna, etc.) to the wireless remote monitoring system 104. Depending on the configuration of the cover system 100 and the tank 300, the components, devices, and/or add-ons connected to the wireless remote monitoring system 104 may or may not be necessarily physically located within the close space 306. As depicted in the embodiment of FIGS. 1 to 4 and 8, the wireless remote monitoring system 104 may comprise a communication port 802a adapted for connecting to and communicating with a communication module card (e.g. a subscriber identification module (SIM) card), and a communication port 802b adapted for connecting to a cable 804 for enabling communication between the wireless remote monitoring system 104 and the sensor 800, as it will become apparent.

In one embodiment of the cover system 100 where the wireless remote monitoring system 104 is received into the recess space 122, such that the wireless remote monitoring system 104 may be partially or totally covered by the bottom face 108 of the lid 102 (shown in to FIGS. 3 and 4), the openings 124a and 124b located on the bottom face 108 of the lid 102 may provide access to the corresponding communication ports 802a and 802b of the wireless remote monitoring system 104.

The cover system 100 may be further provided with at least one sensor adapted for sensing, monitoring, or accessing at least one characteristic or property of a contents contained in the tank 300 or any other container known in the art. In the case where the cover system 100 is provided with such sensor, the sensor may be installed to the tank 300 or container. For example, as illustrated in the embodiment of FIG. 8, the cover system 100 may be provided with a sensor 800 adapted for sensing, monitoring, or accessing one or more parameters related to at least one of the tank 300, the contents of the tank 300, or the environment of the tank 300. For example, the sensor can detect, sense, or monitor a level or a quantity of a fluid 806 (e.g. a liquid or a gas) contained in the tank 300. The sensor 800 may rely, for example, on sound waves (e.g. ultrasound), electromagnetic radiations (e.g. infrared radiation) or any suitable technology or combination of technologies for sensing the level of the fluid 806 contained in the tank 300.

In one embodiment, the fluid 806 is at least one of fuel, diesel, propane, a gas, or oil.

While in the present embodiment the sensor 800 is adapted for sensing, monitoring, or accessing a level or a quantity of a fluid 806 contained in the tank 300, it will be appreciated that in other embodiments the content may be of solid form and the cover system 100 may therefore be provided with a sensor adapted for sensing, monitoring, or accessing any characteristic or property, including a level or a quantity, of any solid(s) contained in the tank 300.

In use, the sensor 800 senses the level of the fluid 806 contained in the tank 300 and generates a representative level signal which is transmitted to the wireless remote monitoring system 104 of the cover system 100 by the cable 804 operatively connecting the sensor 800 and the wireless remote monitoring system 104. The wireless remote monitoring system 104 generates, using the level signal received from the sensor 800, a corresponding transmission signal which is wirelessly transmitted by the wireless remote monitoring system 104. It will be appreciated that the signal is then received by a processing device of a third party. The skilled addressee will appreciate that the wireless remote monitoring system 104 is operatively connected to the processing device of the third party using at least one data network. The data network may comprise at least one of a local area network, a metropolitan area network and a wide area network. In one embodiment the data network comprises a wide area network and the wide area network comprises the Internet.

In one embodiment, the cover system 100 is provided without the cable 804 and the sensor 800 and the wireless remote monitoring system 104 communicate together wirelessly.

In another embodiment, the corresponding transmission signal is transmitted to a third party, which may use the information or telemetry data of the corresponding second signal to schedule delivery of the fluid 806 to the tank 300 when the level of the fluid 806 in the tank 300 reach a given level.

It will be appreciated that the cover system 100 may further comprise at least one battery, not shown, operatively coupled to the wireless remote monitoring system 104 and/or with the sensor 800 for powering same(s). The battery may be located within the close space 306 defined by the lid 102, the peripheral sidewall 302 and the top portion 304 of the tank 300 and may also be located with the wireless remote monitoring system 104 or adjacent thereof.

In one embodiment, the battery is a rechargeable battery.

In another embodiment, the battery is a non-rechargeable battery which may be replaceable from the cover system 100. It will be appreciated by the skilled addressee that in such case, the battery may be embedded or integrated within the lid 102 and a corresponding opening, not shown, may be used to enable a user to access the battery.

The skilled addressee will appreciate that the cover system 100 may provide an increased service lifetime to the wireless remote monitoring system 104. In fact, the larger the batteries are for powering monitoring systems, including the wireless remote monitoring system 104, the longer is the service lifetime of the monitoring systems before a recharge or a replacement of the batteries is required. Indeed, the cover system 100 provides the structural support for affixing, fastening, or securing large and heavy batteries that may be housed or located inside the close space 306. Such large, bulky, and heavy batteries are generally difficult to affix, fasten, secure, or mount outside to tanks, either atop or on the periphery thereof, by conventional means (e.g. by screwing, riveting, and welding a wireless remote monitoring system directly to the tank).

In one embodiment, as depicted in FIG. 8, the cover system 100 comprises an optional solar panel 810 operatively coupled to the battery and/or the wireless remote monitoring system 104 for recharging and/or powering same(s), respectively. The optional solar panel 810 may be located on the top face 106 of the lid 102 of the cover system 100; alternatively, the optional solar panel 810 may be movable and located in a remote location from the lid 102 in order for the optional solar panel 810 to be optimally exposed to the sun.

In an embodiment, the cover system 100 can include a heating element component for the lid 102 to facilitate removal of snow or ice on at least the top face 106 of the lid 102. For example, the heating element component can consume power from a battery to prevent ice or snow accumulation on or around the lid 102 as well as a lock associated with the lid 102.

Figure 9:
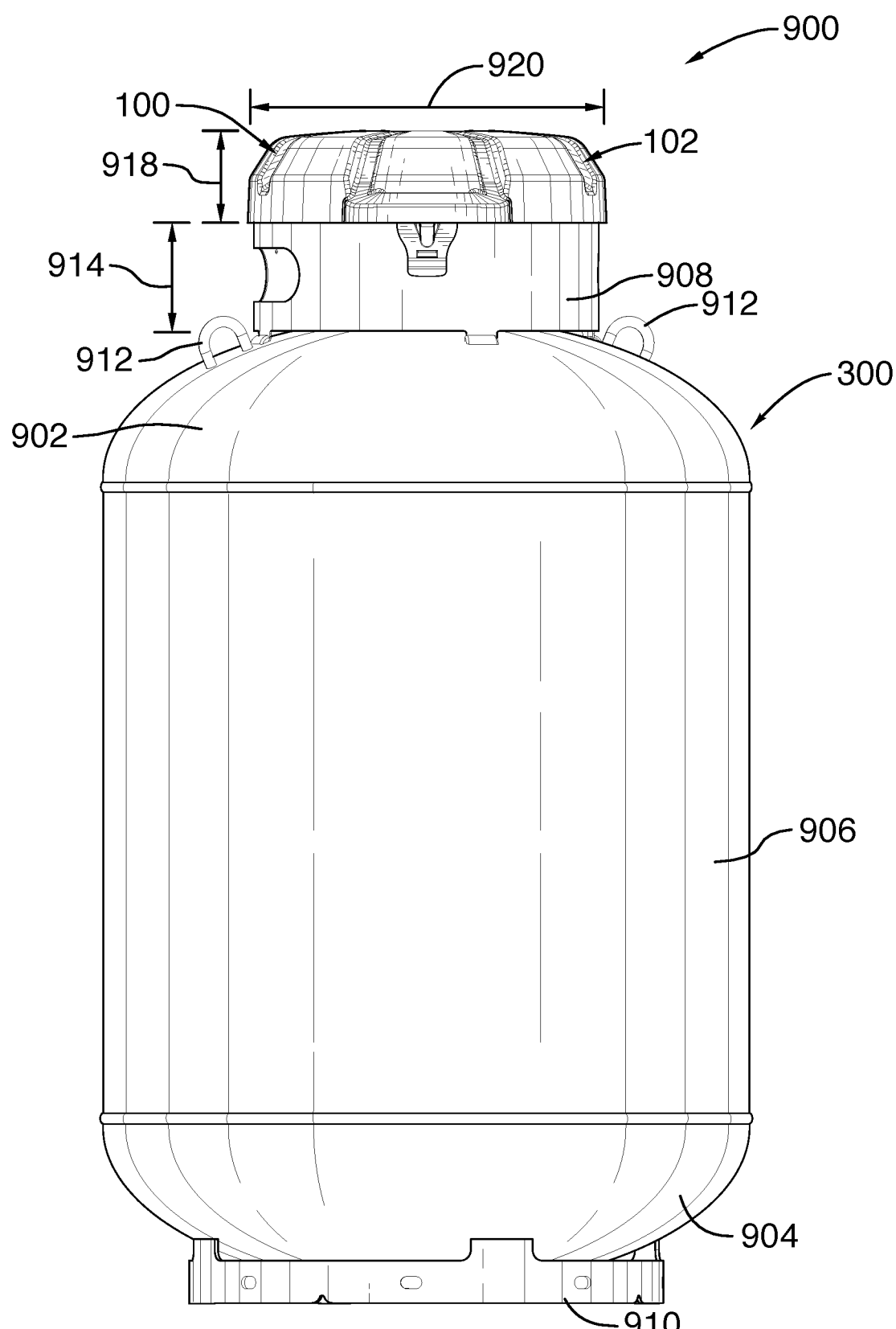
FIG. 9 is an illustration of a tank utilizing a cover system in accordance with the subject innovation.
Figure 10:
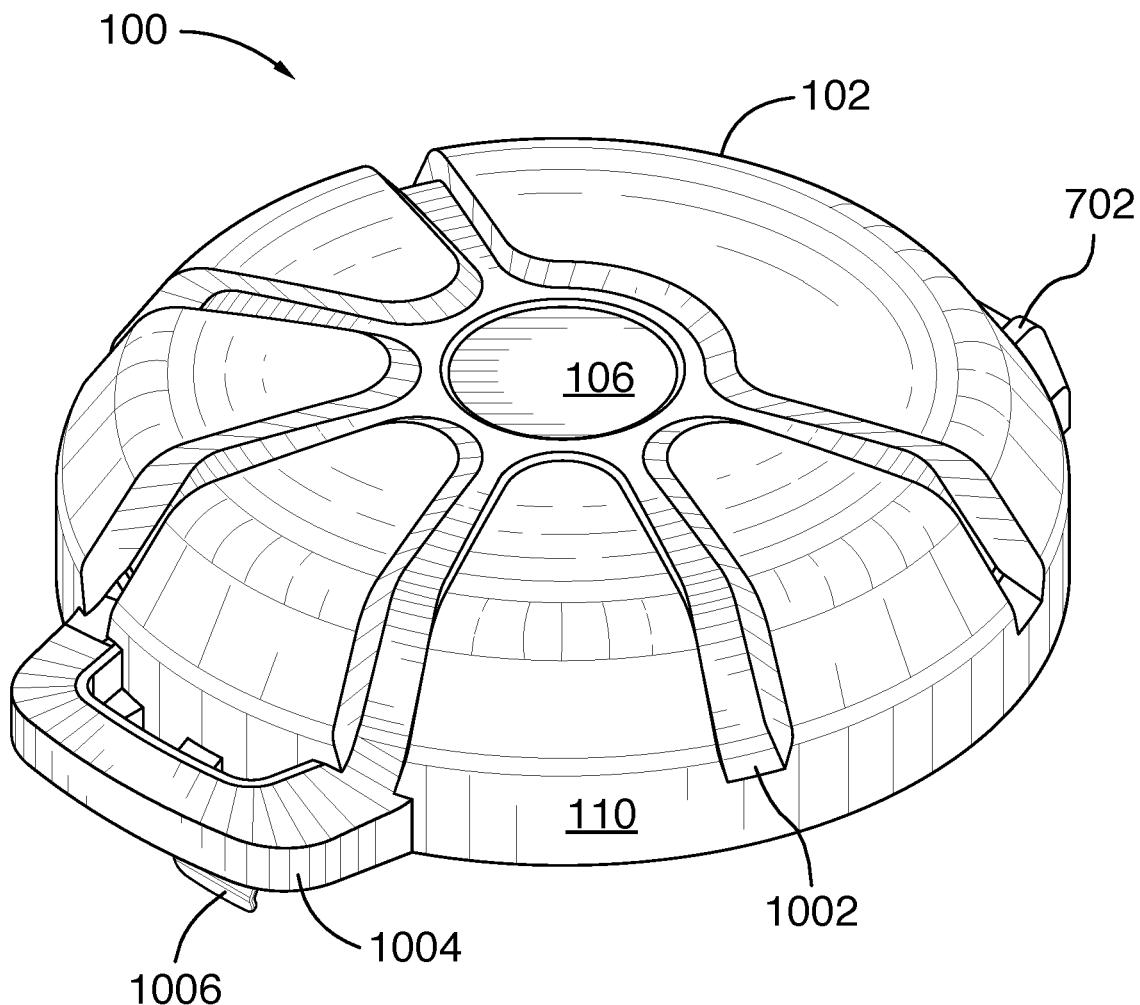
FIG. 10 is a perspective view of the cover system.
Figure 11:
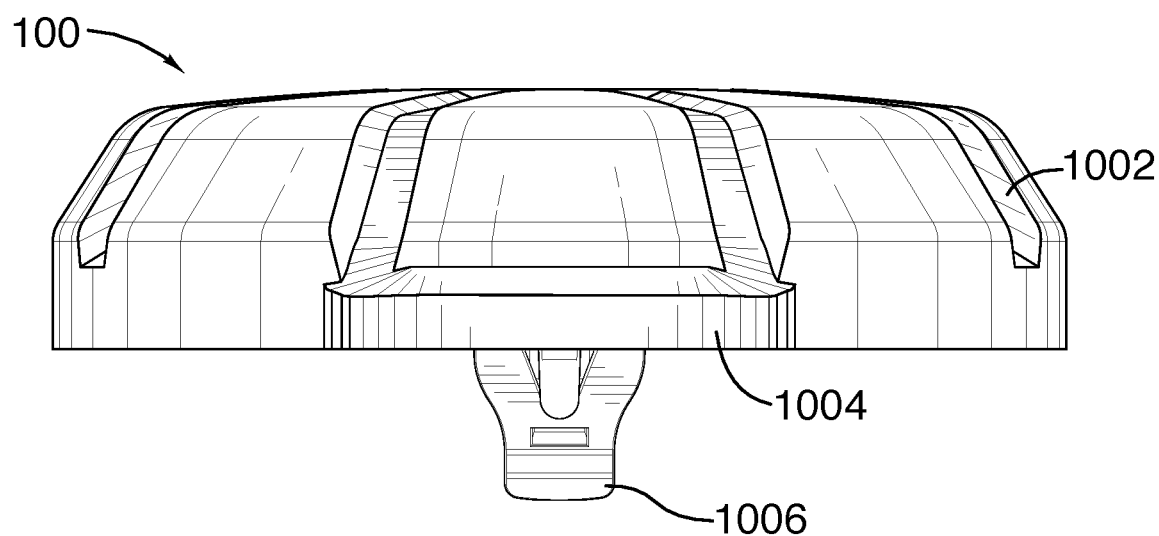
FIG. 11 is a front view of the cover system.
Figure 12:
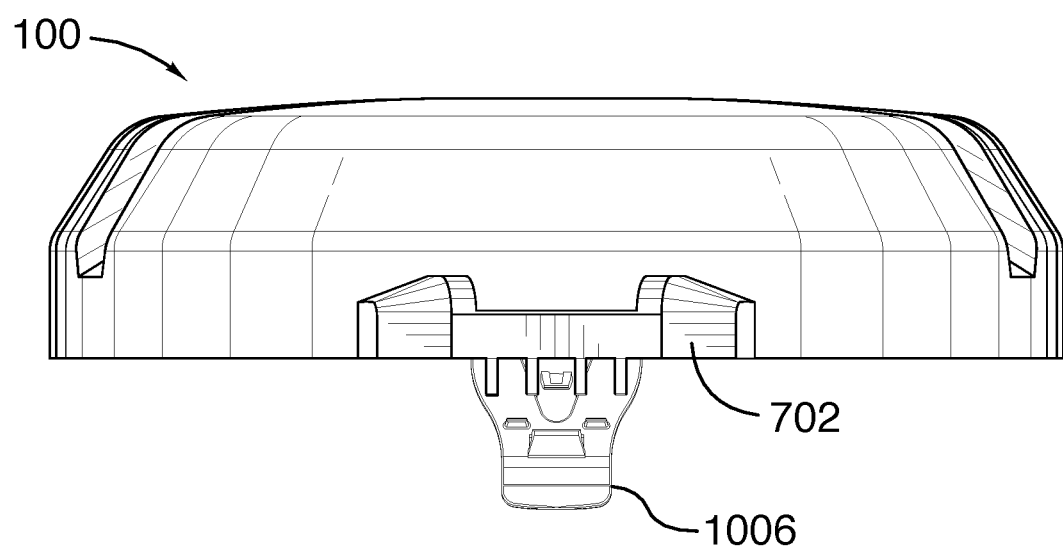
FIG. 12 is a rear view of the cover system.
Figure 13:
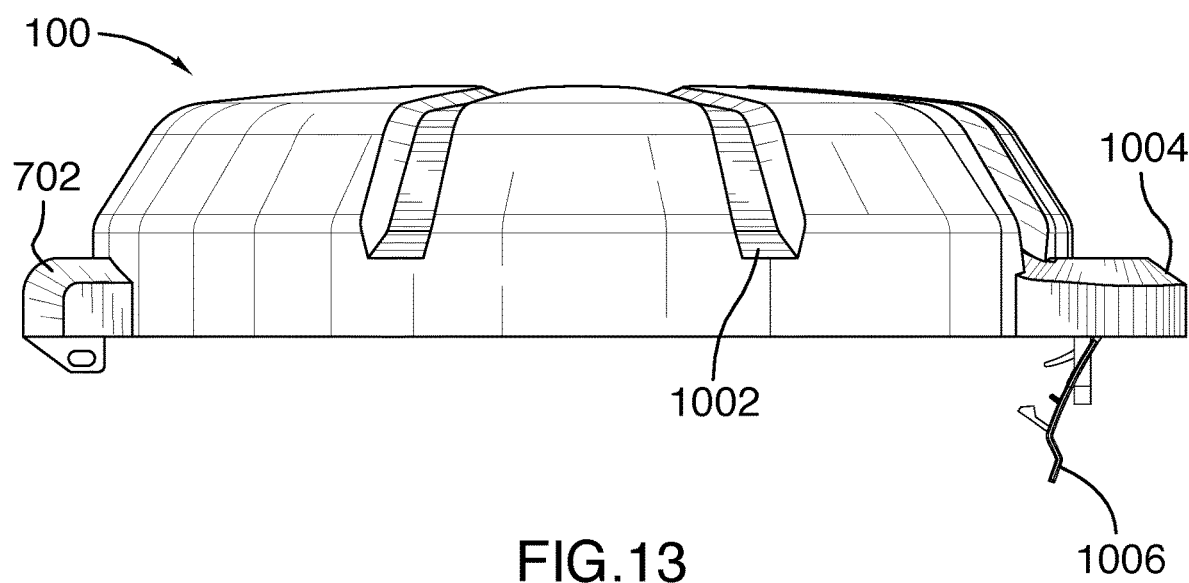
FIG. 13 is a left side view of the cover system, with the right side view being a mirror image thereof.
Figure 14:
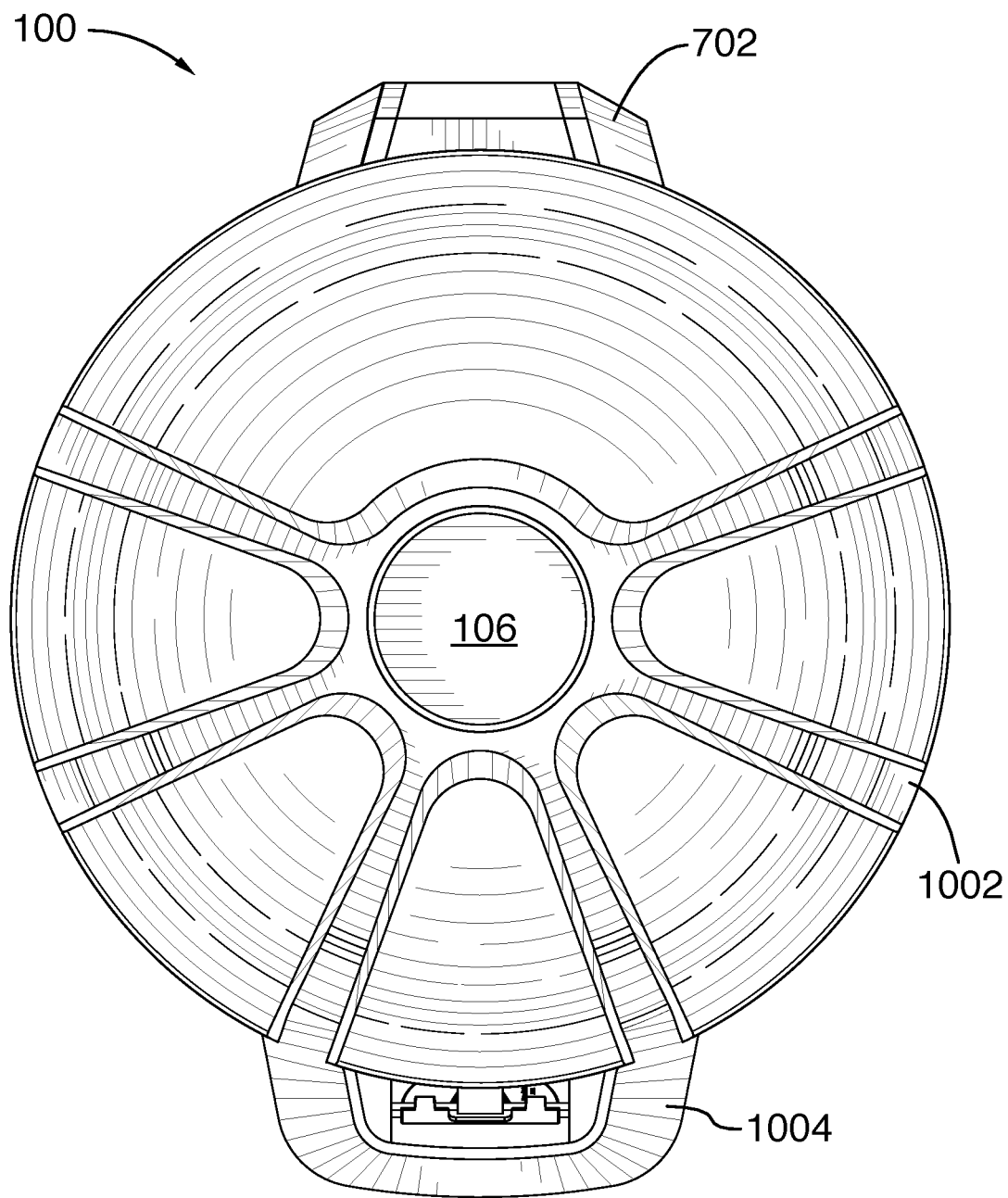
FIG. 14 is a top view of the cover system.
Figure 15:
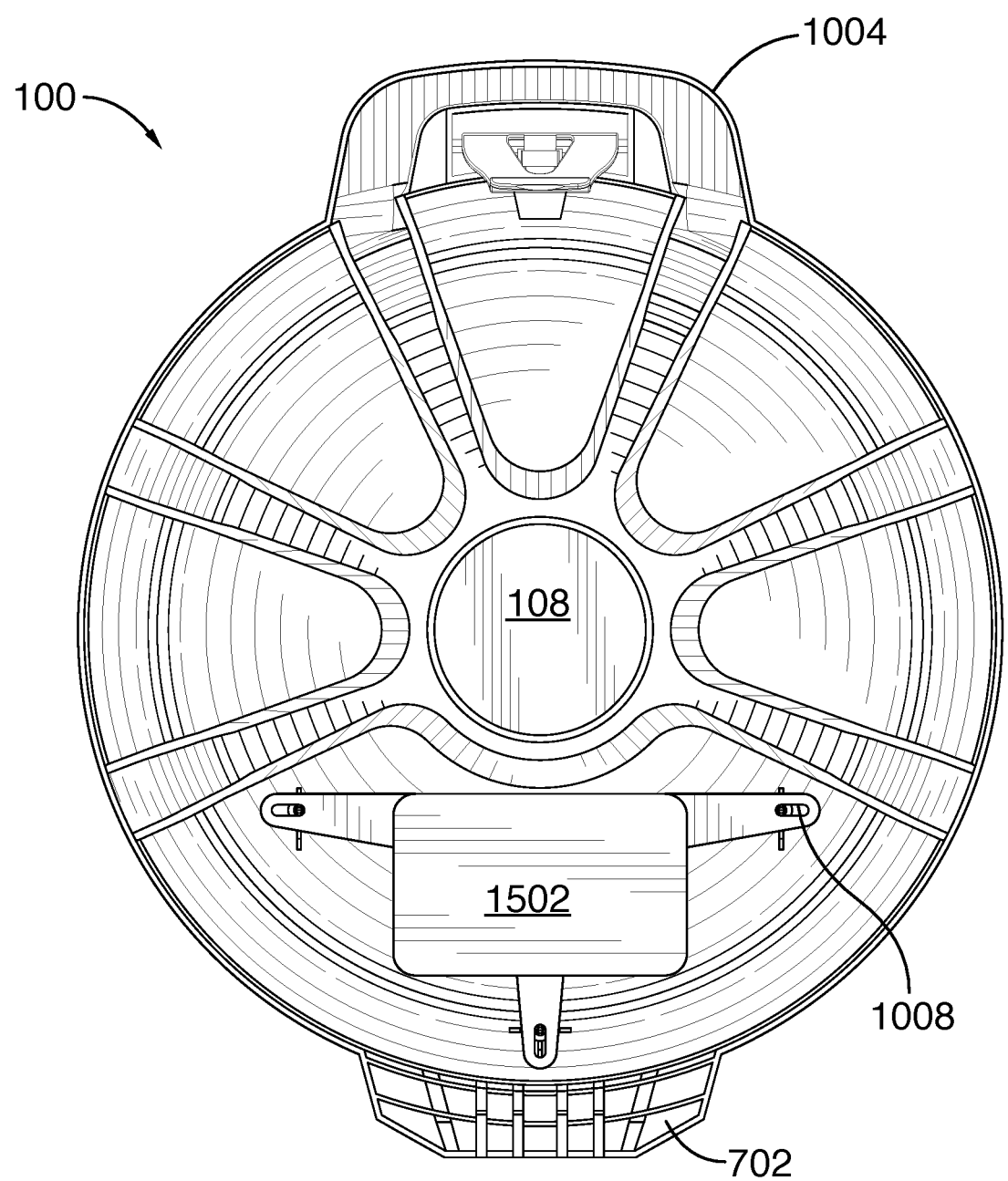
FIG. 15 is a bottom view of the cover system having an embodiment for the wireless remote monitoring system coupled to the lid.
Figure 16:
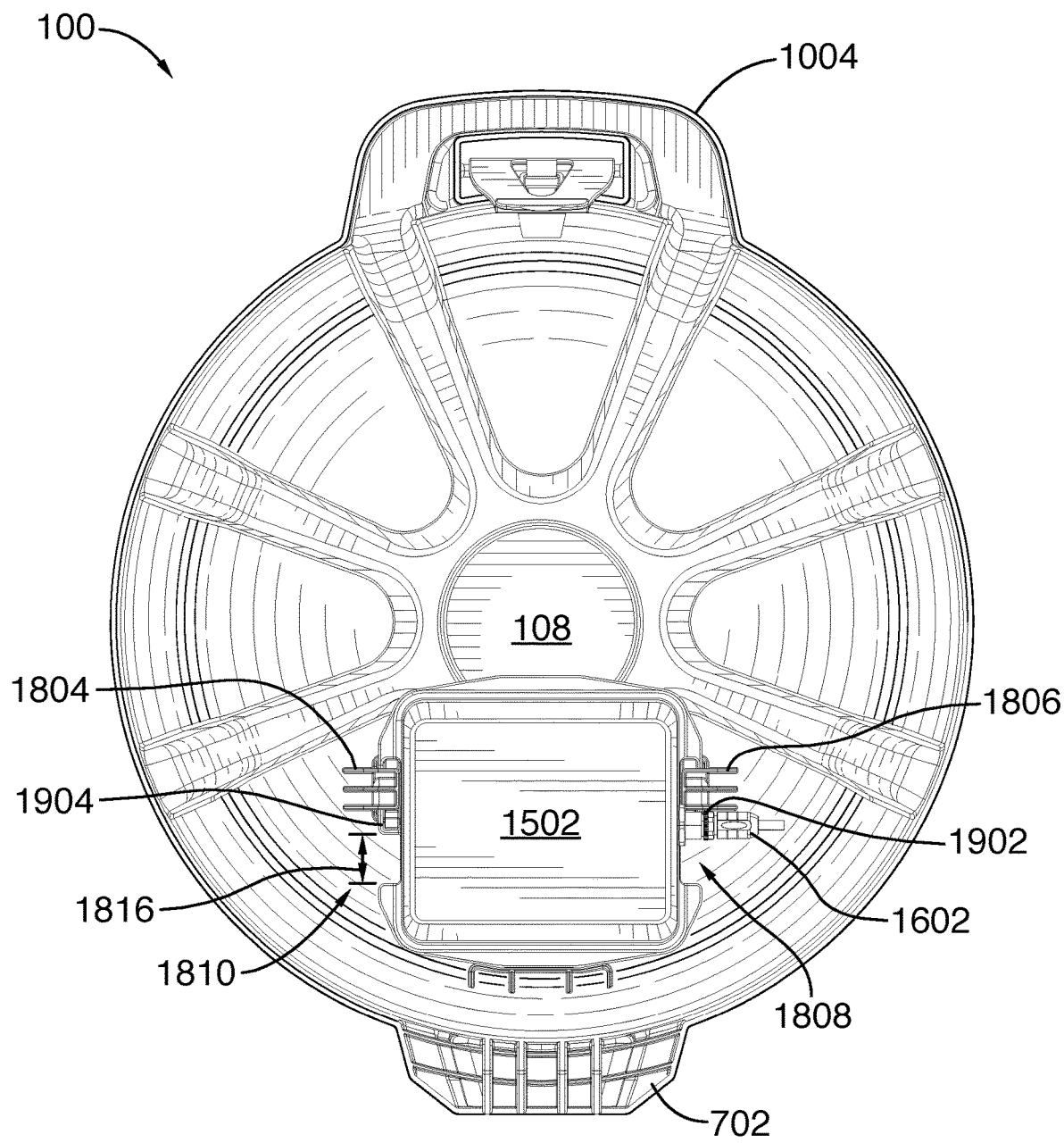
FIG. 16 is a bottom view of the cover system having an embodiment for the wireless remote monitoring system coupled to the lid.
Figure 23:
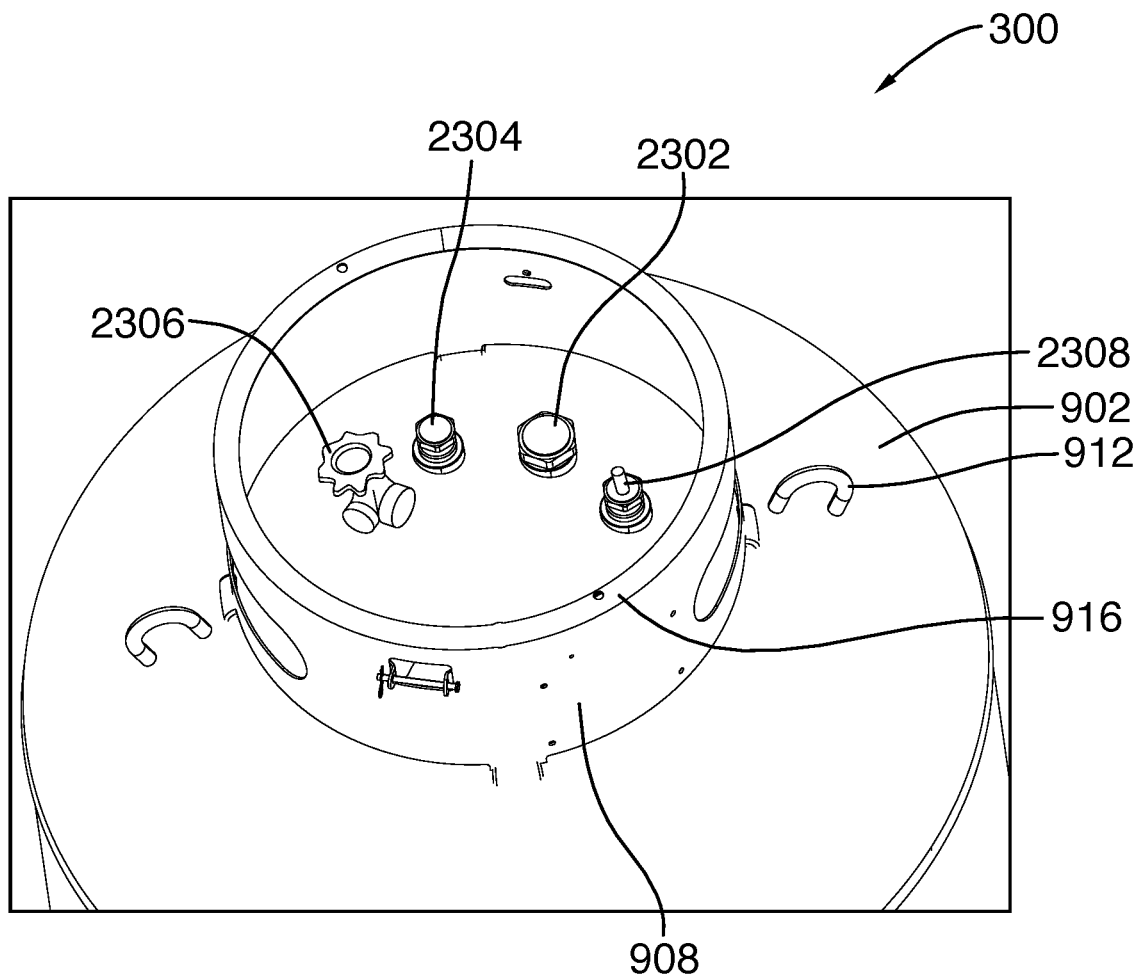
FIG. 23 illustrates a tank in accordance with the subject innovation.

Referring to FIGS. 9 and 23, a system 900 illustrates the tank 300 with the cover system 100 coupled thereto. The tank 300 can be configured to hold a volume. The tank 300 can be generally cylindrical in shape having a top end 902, a bottom end 904 opposite thereto, and a sidewall 906 that couples the top end 902 with the bottom end 904. In one embodiment, a first dome and a second dome are welded together to a sidewall to form the tank 300. The tank 300 can further include a top collar 908 on the top end 902 and a bottom ring 910 on the bottom end 904, wherein bottom ring 910 provides a platform or stand for the tank 300 and the top collar 908 provides protection surrounding valves, gauges, etc. among other benefits. The top end 902 can include one or more eyelets or hooks 912 to facilitate movement or transportation of the tank 300. The tank 300 can be cylindrical in shape with a length, a diameter, and a thickness. By way of example and not limitation, the top collar 908 can have a diameter of approximately sixteen (16) inches but be within the range of ten (10) inches to eighteen (18) inches. Yet, it is to be appreciated that the tank 300 shape, materials, composition, or size can be chosen with sound engineering judgment without departing from the intended scope of coverage of the embodiments of the subject invention. In an embodiment, the tank 300 can be oriented vertically with the bottom end 904 on the ground and the top end 902 in the air. In another embodiment, the tank 300 can be oriented horizontally and having a top collar on a top of the sidewall which is opposite to a bottom sidewall that is generally parallel with the ground. It is to be appreciated that this subject innovation can be utilized for either horizontal or vertical orientation of the tank 300.

The tank 300 can include one or more liners of a material. For instance, the tank 300 can include a liner made of a first material. In certain embodiments, the first material is at least one of a plastic, a metal, a steel, a thermoplastic, a polymer, Pinnacle Polymers Polypropylene 4220H, Polypropylene, ABS, among others. In certain embodiments, the tank 300 can include a wrapping of a second material. In certain embodiments, the second material is at least one of a carbon fiber, a composite material, a Teflon, or a disparate material from the first material. In certain embodiments, the tank 300 is made of at least one of a metal, a plastic, a polymer, or a composite material.

In an embodiment, the tank 300 can include a closed end on the bottom end 904 and one or more open ends opposite thereto (e.g., on the top end 902), wherein the open end is integrated with at least one of a fill valve 2302, a pressure relief valve 2304, a valve 2306, a regulator (coupled to the valve 2306), a gauge 2308, among others. For instance, the valve can be a two-way valve that allows material to enter the tank 300 and also allow the material to exit the tank 300. It is to be appreciated that the open end on the tank 300 can be configured to receive material that is stored in the tank 300 and/or configured to dispense material that is stored in the tank 300, wherein the dispensing/receiving is with a component such as a valve, port, and the like. In another embodiment, the tank 300 can include a valve and a pressure relief valve, wherein the pressure relief valve can be configured to release pressure from the tank 300 based on a parameter such as a pressure level, a safety event, a computer instruction to release the material in the tank 300, among others. It is to be appreciated that the tank 300 can be fluidly coupled to a home or a portion of a home to provide contents within the tank 300 via one or more valves, regulators, tubing, piping, etc.

Moreover, it is to be appreciated that the tank 300 can include one or more chambers within to house one or more materials or materials that are designated for particular locations, units, or houses. For example, a tank 300 can be segmented to have a first chamber that houses a first material filled/dispensed with a first valve on the top end and a second chamber that houses a second material filled/dispensed with a second valve on a bottom end opposite to the top end.

It is to be appreciated that the tank 300 can house a portion of a material, wherein the material can be a solid, a gas, a liquid, a plasma, among others. By way of example and not limitation, the material can be an alternative fuel. In still another example that is not limiting on the subject innovation, the material can be a material at a high pressure in comparison to an atmospheric pressure.

In still another example, one or more tank 300 can be used to store material for use with a fuel system for a vehicle or home. For example, in addition to compressed natural gas, the tank 300 can be utilized with a fuel system or propane system for a home that utilizes or consumes material such as renewable fuel sources, nonrenewable fuel sources, liquid fuel sources, or gas fuel sources for a vehicle or home, wherein the tank 300 can store such renewable fuel sources, nonrenewable fuel sources, liquid fuel sources, or gas fuel sources. Renewable fuel sources can include biofuels such as vegetable oil, ethanol, methanol, butanol, other bioalcohols, biomass, or biodiesel, among others. Renewable fuel sources can also include hydrogen and/or hydrogen fuel cells, refuse-derived fuel, chemically stored fuel, non-fossil methane, non-fossil natural gas, Ammonia, Formic acid, liquid Nitrogen, compressed air, or propane derived from renewable methods, among others. Nonrenewable fuel source can include gasoline, propane, or diesel, among others. Additional liquid or gas fuel sources can include any mixture or blend of energy sources, for example, E10, E15, E30, or E85 fuel, or HCNG (blend of compressed natural gas with Hydrogen). It is be appreciated that the tank 300 can house a material chosen with sound engineering judgment without departing from the intended scope of coverage of the embodiments of the subject invention and such material can be used for a fuel system of a vehicle, a machine, a device, a home, or any combination thereof.

The lid 102 includes the periphery 112 that can releasibly couple to a top portion of the top collar 908. In particular, the lid 102 can include a diameter 920 that allows the lid 102 to fit or mate with a periphery 916 of the top collar 908. In an embodiment, the diameter 920 of the lid 102 can be greater than the diameter of the top collar 908 to allow for an overhang of the lid 102 over the top collar 908. In another embodiment, the diameter 920 of the lid 102 can be smaller than the diameter of the top collar 908. In still another embodiment, the diameter 920 of the lid 102 can be substantially similar to the diameter of the top collar 908. It is to be appreciated that the diameter 920 of the lid 102 can be chosen with sound engineering without departing from the scope of the subject innovation and such diameter 920 and other dimensions of the lid 102 (e.g., height, thickness, etc.) are intended to be within the scope of this subject innovation. Further, the periphery 112 of the lid 102 can mate or be in contact with the periphery 916 of the top collar 908.

The periphery 916 can define a plane to which the lid 102 is positioned or situated upon to protect and cover the top portion of the tank 300 and elements defined within the top collar 908. The top collar 908 can include a height 914, wherein the wireless remote monitoring system 104 can be positioned above such height 914 to facilitate wireless communications to and from. In particular, the wireless remote monitoring system 104 can be positioned above the plane corresponding to the periphery 916 so as to remove any interference with the top collar 908 of the wireless signals to and from. In particular, the wireless remote monitoring system 104 or a portion related to wireless communications (e.g., antenna, RFID, receiver, transmitter, etc.) can be situated at a location above the plane defined by the periphery 916 of the top collar 908. In an embodiment, the wireless remote monitoring system 104 or a portion related to wireless communications (e.g., antenna, RFID, receiver, transmitter, etc.) can be situated flush with the plane defined by the periphery 916 of the top collar 908. In another embodiment, the wireless remote monitoring system 104 or a portion related to wireless communications (e.g., antenna, RFID, receiver, transmitter, etc.) can be situated 0.5 inches to 1.5 inches above the plane defined by the periphery 916 of the top collar 908. In a particular embodiment, the wireless remote monitoring system 104 or a portion related to wireless communications (e.g., antenna, RFID, receiver, transmitter, etc.) can be situated at a location that is not above at least one of the valve 2306, the regulator, the valve 2306 coupled to the regulator, or a combination thereof. In a particular embodiment, the lid 102 can have the height 918 of 2.7 inches. In another particular embodiment, the lid 102 can have the height 918 of 4 inches.

In an example, the lid 102 can have a height 918 of approximately two (2) inches to five (5) inches, wherein the thickness of the lid 102 can be approximately 0.06 inches to 0.16 inches. It is to be appreciated that the thickness or height of the lid 102 can be chosen with sound engineering without departing from the scope of the subject innovation and such height and thickness a of the lid 102 outside these ranges are intended to be within the scope of this subject innovation.

Turning to FIGS. 10-17, 21, and 22 the cover system 100 is illustrated. The cover system 100 can include a lid 102 that includes a top face 106, a bottom face 108, and a peripheral side flange 110 extending on a periphery 112 of the lid 102, on the bottom face 108 thereof as described in FIGS. 1-8. As discussed, the wireless remote monitoring system 104 can be affixed or releasably coupled to a portion of the lid 102 such as, but not limited to, the top face 106, the bottom face 108, the peripheral side flange 110, or a combination thereof.

The lid 102 can further include one or more channels 1002 on the top face 106 of the lid 102. The one or more channels 1002 can be configured to be indents into the top face 106 of the lid 102. In an embodiment, the wireless remote monitoring system 104 can be affixed or releasably coupled to the bottom face 108 of the lid 102 such that the wireless remote monitoring system 104 is not on or overlap with the one or more channels 1002. It is to be appreciated that the one or more channels 1002 can be positioned or located in a suitable pattern or have a depth for indent as chosen by one of sound engineering judgement and such are to be included within the scope of the subject innovation.

The lid 102 can include a handle grip 1004 that facilitates opening and closing the lid 102 onto the tank 300. The handle grip 1004 can include a recess to allow a portion of a hand to grip so a force can be applied to move the lid 102 through a path of movement defined by the hinge 702. It is to be appreciated that the handle grip 1004 can be positioned on a location on lid 102 such as the outside of the peripheral side flange 110. In a particular embodiment, the handle grip 1004 is positioned opposite to the hinge 702 on the peripheral side flange 110.

The lid 102 can further include a latch 1006 that facilitates maintaining the lid 102 in a closed state. The latch 1006 can be affixed to the periphery side flange 110 on the lid 102 and can mate or attach to a location on the tank 300 and in particular, the top collar 908. In an embodiment, the latch 1006 can include a lock that allows for securing access to the components within the top collar 908.

The wireless remote monitoring system 104 can be a housing 1502 that can be affixed to a portion of the lid 102. It is to be appreciated that the housing 1502 can be affixed permanently or releasably affixed to a portion of the lid 102. Such attachment can be, but is not limited to, a glue, a screw, a male/female mating connection, a weld, a plastic heat weld, an adhesive, use of magnets, a snap and clip mechanism, among others. The housing 1502 can include a top, a bottom, a left side, a right side, a front, and a back, wherein the housing 1502 can have a length, width, height, and a thickness. The housing can be, but is not limited to a rectangle shape. The housing 1502 can be a geometric shape that can be configured to be contained within the lid 102 or on a portion of the lid 102, wherein the geometric shape can be, but not limited to, circular, oval, round, square, pentagon, rectangle, hexagon, polygon, triangle, among others. The housing 1502 can be further fabricated from a material such as, but not limited to, metal, plastic, aluminum, a polymer, a composite material (e.g., a combination of metal with plastic, etc.), chrome, nickel, among others. It is to be appreciated that fabricating the housing 1502 can be performed by any suitable technique having a shape and a material and such can be chosen with sound engineering judgment without departing from the intended scope of coverage of the embodiments of the subject innovation. For example, the forming of housing 1502 can be from injection molding having a shape made from plastic or by use of three-dimensional printing. In still another example, the housing 1502 can be made from metal with a shape.

The housing 1502 can include one or more components to facilitate gathering data from the sensor 800 and communicating such data wirelessly. For example, the housing 1502 can include a printed circuit board (PCB), a battery, an antenna, etc. It is to be appreciated that the cover system 100 can include one or more housings 1502 to house one or more components for the cover system 100 (e.g., memory, processor, receiver, transmitter, electrical connectors or wires, sensor, among others). In an embodiment, the housing 1502 is sealed to be waterproof.

In a particular embodiment, the housing 1502 can include a surface mounted antenna that can be mounted on at least one of the top face 106, the bottom face 108, the inside of the peripheral side flange 110, the outside of the peripheral side flange 110, a location on or in the grip handle 1004, a location on or in the hinge 702, or a combination thereof. The housing 1502 can further include one or more couplings or connectors 1602 to wire to components or sensors 800 for the cover system 100 and in turn, the tank 300. In an embodiment, the housing 1502 can include one or more hooks or brackets to secure couplings or connectors 1602 to a portion of the lid 102.

The housing 1502 can include a first indent 1808 on a left side and a second indent 1810 on a right side, wherein such indents (first indent 1808 and second indent 1810) are configured facilitate attachment to the lid 102 (discussed in more detail below).

Figure 17:
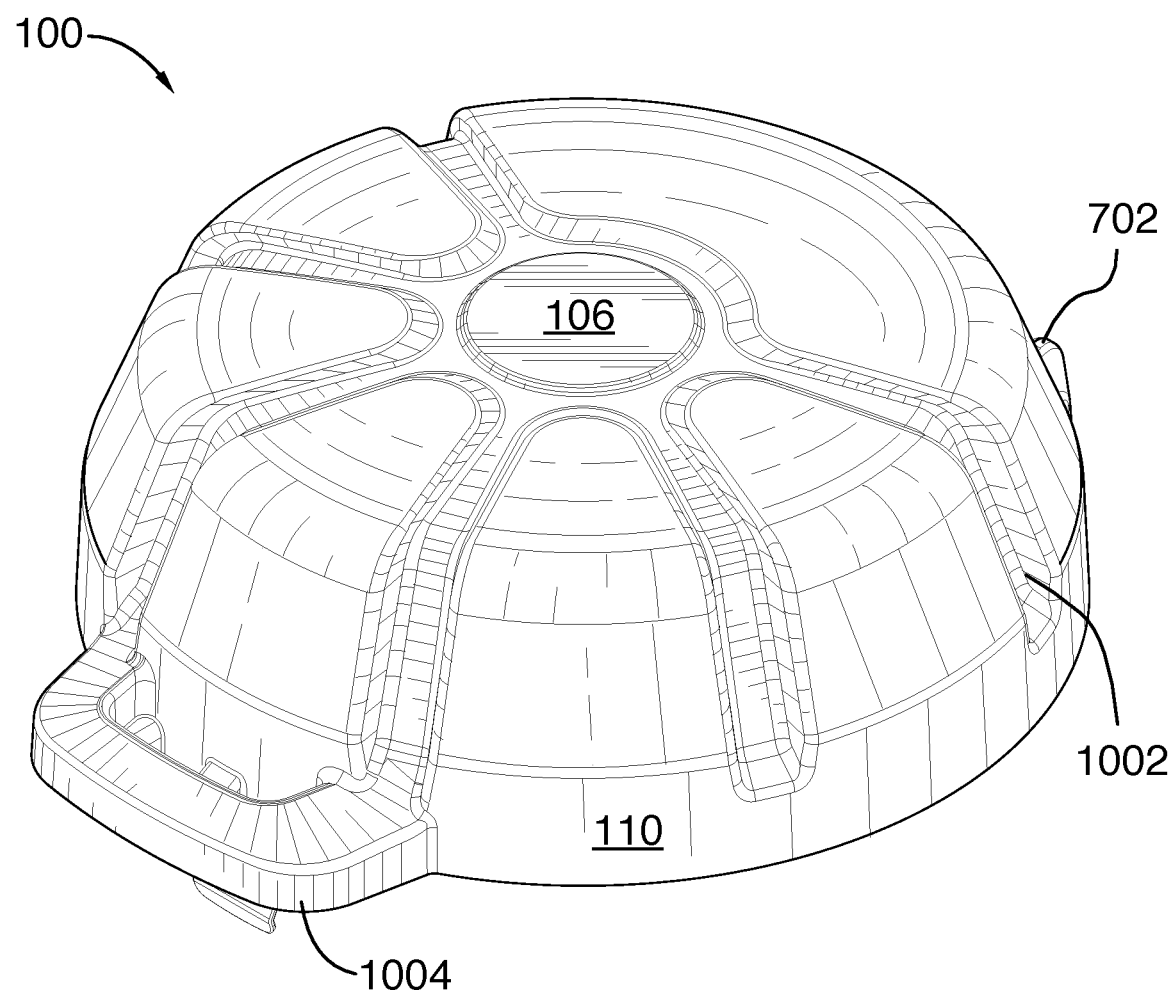
FIG. 17 is a perspective view of an embodiment of the cover system.

FIG. 17 illustrates an embodiment of the cover system 100 that includes the height 918 larger to afford more interior space within the space 114. As discussed, the height 918 of the lid 102 can be selected with sound engineering judgment without departing from the scope of the subject innovation.

Figure 18:
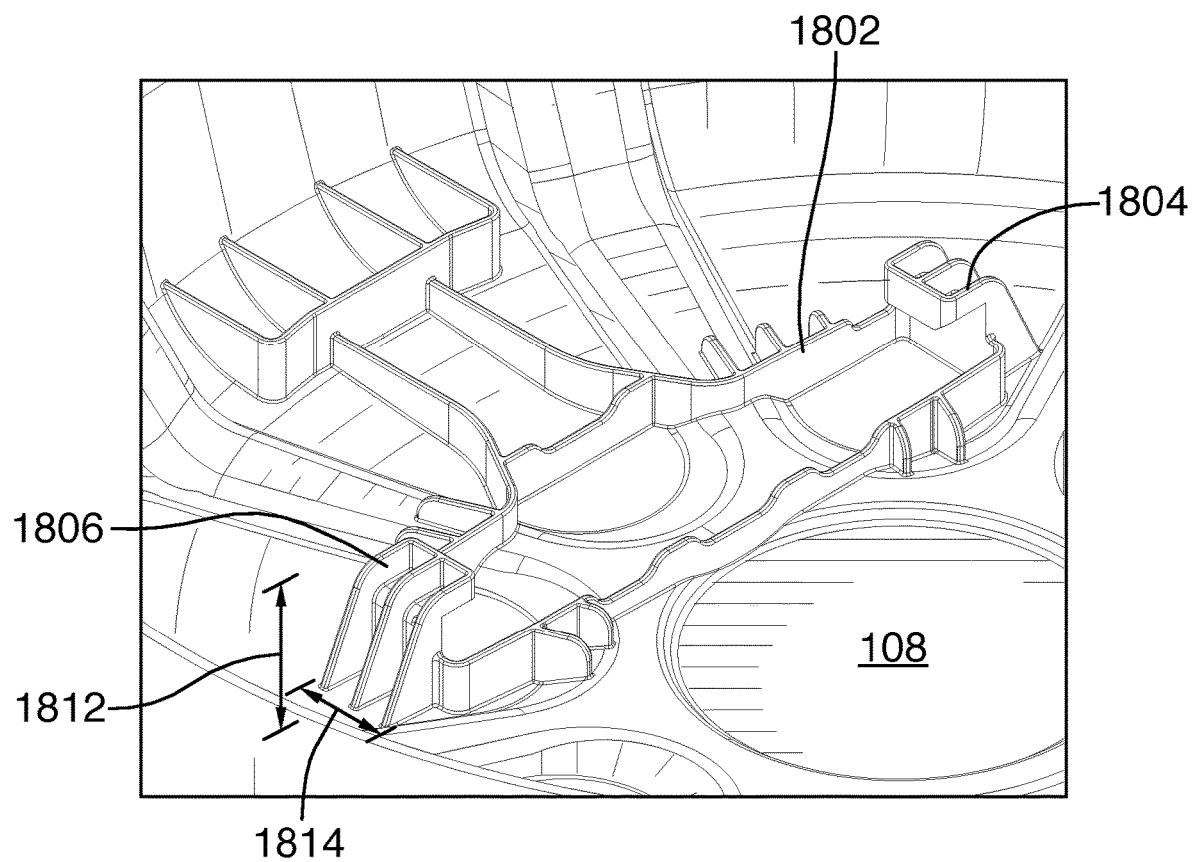
FIG. 18 is a perspective view of a bottom face of a lid for a cover system, wherein the bottom face includes a bracket to attach a wireless remote monitoring system.
Figure 19:
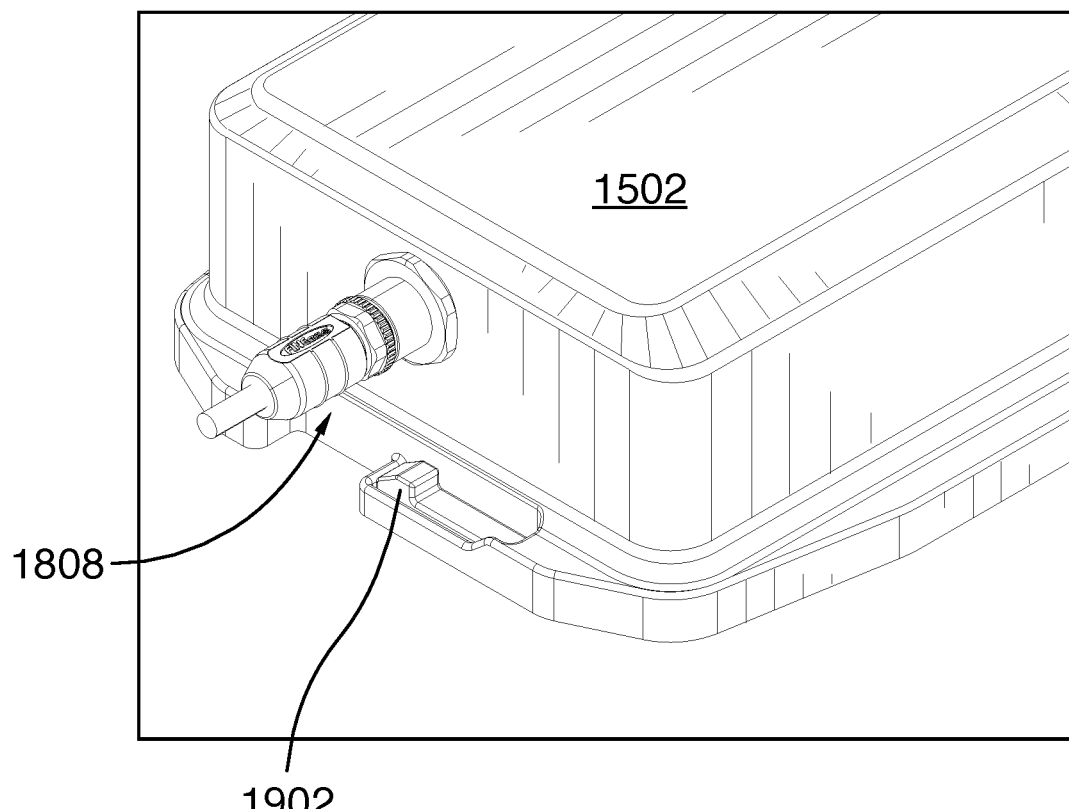
FIG. 19 illustrates a module that houses the wireless remote monitoring system.
Figure 20:
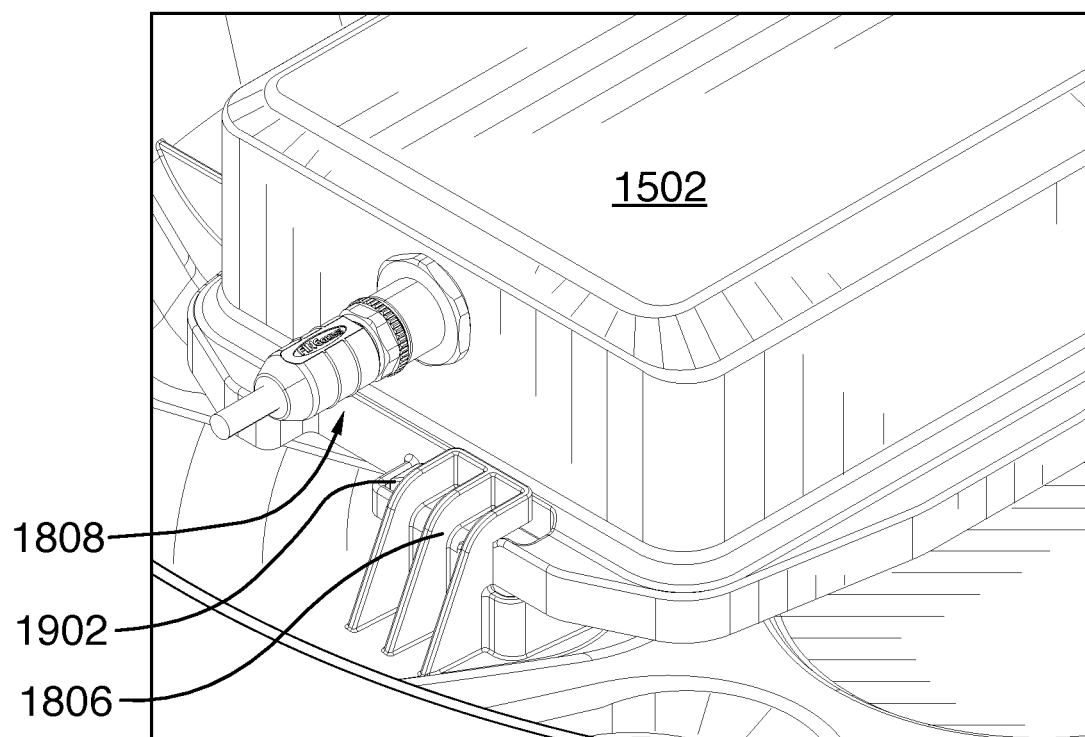
FIG. 20 illustrates a module that houses the wireless remote monitoring system, wherein the module is attached to the lid.

FIGS. 18-20 illustrate an embodiment to releasably attach the wireless remote monitoring system 104 to the bottom face 108 of the lid 102. In particular, one or more components of the wireless remote monitoring system 104 can be included within the housing 1502. As discussed, the housing 1502 can include the first indent 1808 on the left side of the housing 1502 and the second indent 1810 on the right side of the housing 1502. The first ident 1808 and the second indent 1810 can be configured to have dimensions that allow insertion onto a bracket 1802. The bracket 1802 can include a first arm 1804 and a second arm 1806. It is to be appreciated that the dimensions of the first arm 1804 and the second arm 1806 can correspond with the first indent 1808 and the second indent 1810. For example, the second arm 1806 can have a height 1812 and a width 1814 that corresponds with a height and a width 1816 of the second indent 1808 such that the second arm 1806 fits into the second indent 1808 and allows mating with a bias member 1902. It is to be appreciated that the first arm 1804 can have a height and a width that corresponds to a height and a width of the first indent 1810 such that the first arm 1804 fits into the first indent 1810 and allows mating with a bias member 1904 on the corresponding side. The bias members 1902 and 1904 can include a ramp and raised portion such that the ramp portion allows for facilitated movement through the corresponding arm and the raised portion can secure movement by contacting the arm. The arms, indents, and bias members, are configured to provide a slide and snap attachment of the housing 1502 to the bracket 1802 as well as allowing removal of the housing 1502 from the bracket 1802 by depressing the bias members (in particular the ramp and raised portion) and sliding to align the arms with the indents. It is to be appreciated that the bracket 1802 can be permanently or removeably attached to the bottom face 108 of the lid 102 as described in the subject innovation.

Figure 24:
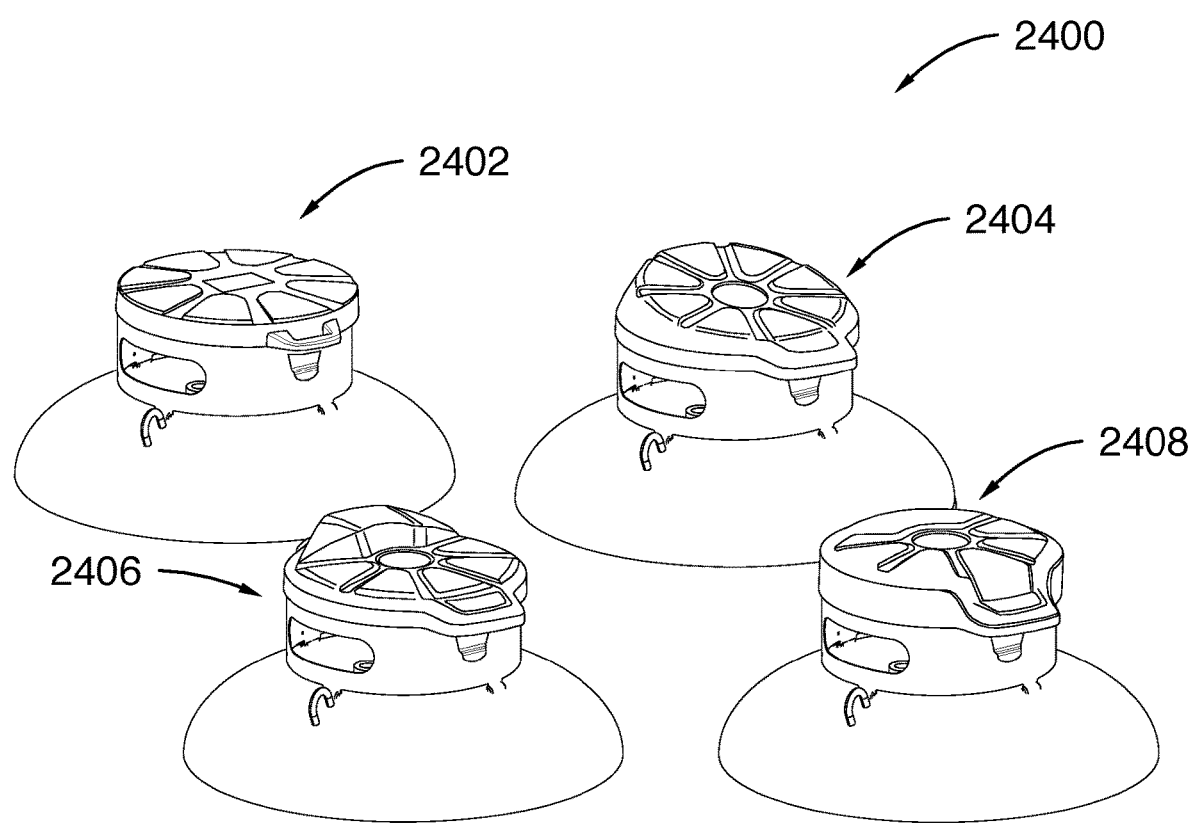
FIG. 24 illustrates embodiments of the cover system utilizing various configurations for a top face of the lid.

FIG. 24 illustrates embodiments of cover systems in accordance with the subject innovation. As discussed above, the lid 102 can include the top face 106, wherein the top face 106 can include various contours, indents, channels, patterns, or topography. In particular, the cover system 2402 can include the top face that is substantially flat comparative to a plane defined by the periphery 916 of the top collar 908. The cover system 2404 can include a ramp contour with a slope comparative to a plane defined by the periphery 916 of the top collar 908. The cover system 2406 can include a first level on a second level, wherein the first level is above the second level and the second level is above the plane defined by the periphery 916 of the top collar 908. The cover system 2408 includes a portion of the top face 106 raised comparative to a plane defined by the periphery 916 of the top collar 908.

Figure 25:
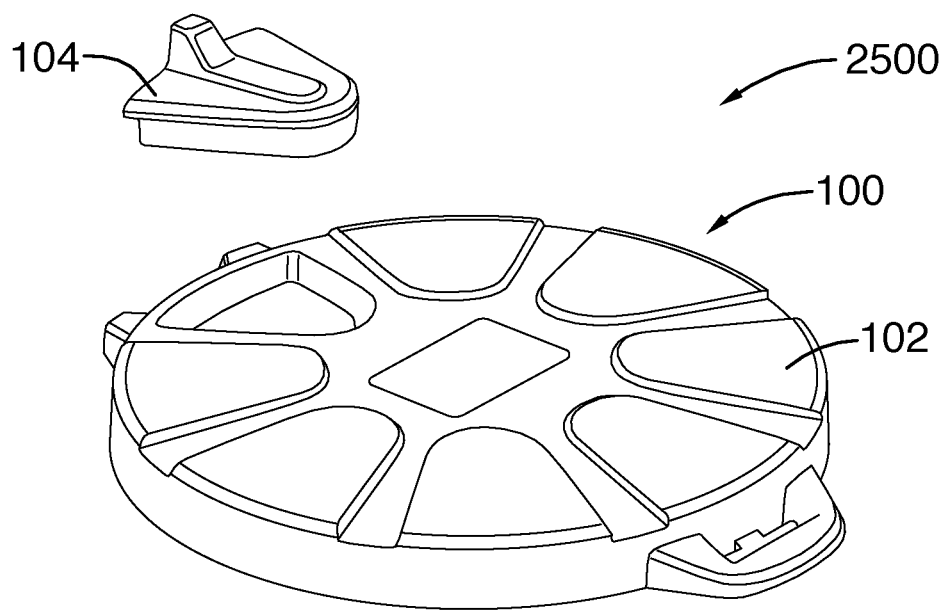
FIG. 25 illustrates a cover system utilizing a wireless remote monitoring system on a top face of the lid.

FIG. 25 illustrates a cover system 2500 that includes the wireless remote monitoring system 104 on the top face 106 of the lid 102. The wireless remote monitoring system 104 can include a housing that mates with and incorporates into the lid 102.

Figure 26:
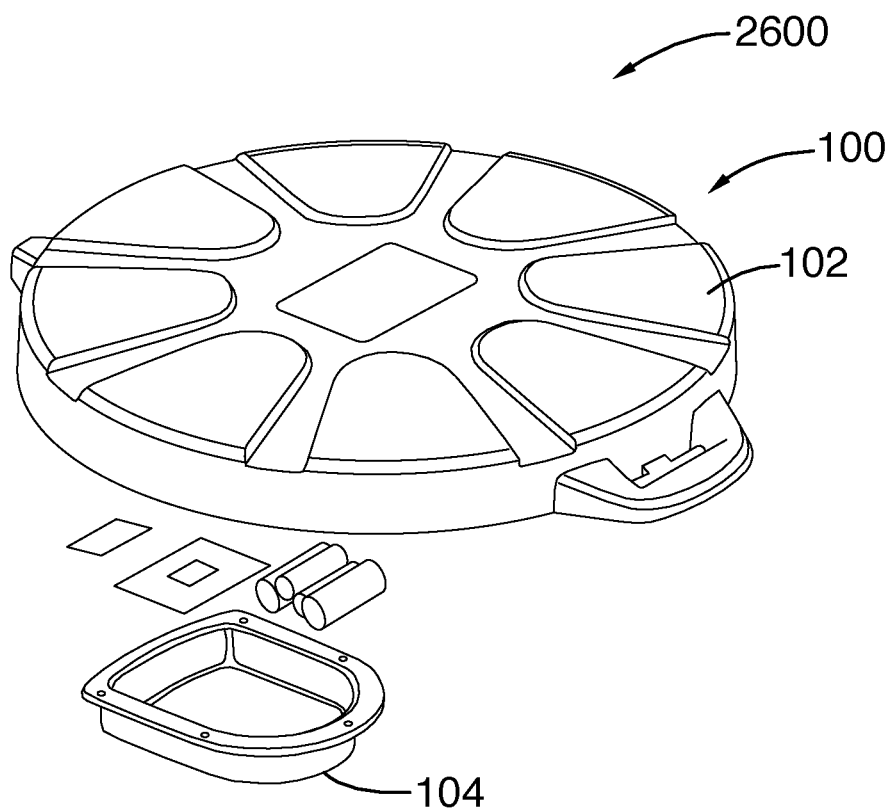
FIG. 26 illustrates a cover system utilizing a wireless remote monitoring system on a bottom face of the lid.

FIG. 26 illustrates a cover system 2600 that includes the wireless remote monitoring system 104 on the bottom face 108 of the lid 102. The wireless remote monitoring system 104 can include a housing that couples to the bottom face 108 of the lid and can include a housing that protects an antenna, a PCB, one or more batteries, among others.

Figure 27:
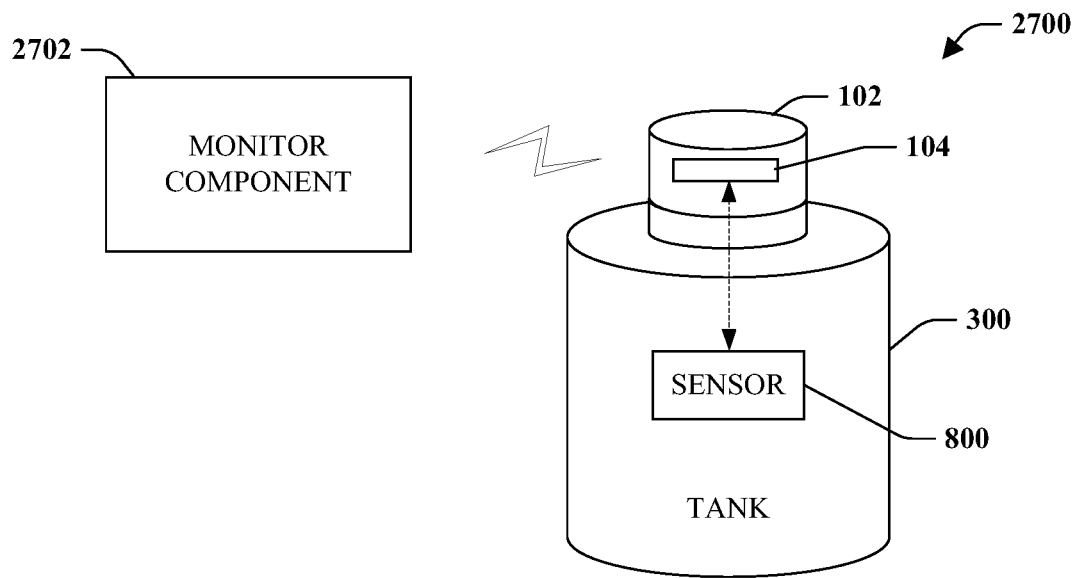
FIG. 27 is a block diagram a system that aggregates information related to a tank.

FIG. 27 is an illustration of a system 2700 that facilitates tracking one or more parameters for a tank 300 and/or a contents of the tank 300. The system 2700 can include a monitor component 2702 that is configured to communicate with wireless remote monitoring system 104 in which signals can be transmitted from the monitor component 2702 to the wireless remote monitoring system 104 and signals can be received by the monitor component 2702 from the wireless remote monitoring system 104. The sensor 800 can be coupled to the tank 300 at a location inside the tank 300 or inside the tank 300, wherein the sensor 800 can transmit a signal packaged with a portion of data to the wireless remote monitoring system 104. The sensor 800 can be coupled, affixed, or releasably coupled to the tank 300 on a location such as, but not limited to, a top, a bottom, a sidewall, an inside wall, an outside wall, a combination thereof, among others. The sensor 800 is configured to communicate wirelessly or through a wired connection to the wireless remote monitoring system 104. It is to be appreciated that the sensor 800 can transmit and/or receive data wirelessly or wired with the wireless remote monitoring system 104. Moreover, it is to be appreciated that the wireless remote monitoring system 104 can transmit and/or receive data wirelessly or wired with the monitor component 2702. Additionally, the monitor component 102 can communicate with the wireless remote monitoring system 104 and/or the sensor 800 in a wired technique, a wireless technique, or a combination thereof.

It is to be appreciated that the system 2700 can include one or more wireless remote monitoring system 104, wherein each wireless remote monitoring system can be at a geographic location and that the one or more wireless remote monitoring system 104 can receive data from and/or transmit data to one or more sensors coupled to respective tanks. Moreover, each location can include a respective monitor component 2702 to ascertain a condition or parameter of the tank 300 and/or a condition or parameter of the contents in the tank 300.

The wireless remote monitoring system 104 can receive a first package of data from the sensor 800, wherein the first package of data can include a unique universal identification (UUID) of the tank 300 as well as data related to modules of the sensor 800. The sensor 800 can include modules that allow detection of an amount of movement of or impact to the tank 300, a temperature of the tank 300 or the temperature of an environment the tank 300 is located, an amount of contents dispensed from the tank 300 or an amount of contents filled into the tank 300, a battery parameter (e.g., heath of battery, battery life, battery duration of use or activity, etc.) for the wireless remote monitoring system 104, a lid position of the lid 102 (e.g., open, closed, or a position in between open and closed), a duration of time the lid 102 is open, a volume level of the contents of the tank 300, a period of time between the lid 102 being opened, among others. It is to be appreciated that the sensor 800 can include a module that is configured to detect a parameter related to the tank 300 or the contents of the tank 300 to improve quality or condition of at least one of the tank 300 or the contents of the tank 300.

The wireless remote monitoring system 104 can be placed on the lid 102 at a geographic location and the wireless remote monitoring system 104 can include a unique universal identification (UUID). Data is communicated from the sensor 800 to the wireless remote monitoring system 104 and can be referred to as a first data package. The first data package can include the UUID of the sensor 800 and data from the modules of the sensor 800 (e.g., readings, numerical information, etc.). The wireless remote monitoring system 104 can receive the first package data and can communicate a second data package to the monitor component 2702, wherein the second data package can include at least the contents of the first data package, a UUID of the wireless remote monitoring system 104 (also referred to as ID), a timestamp, or a combination thereof. The wireless remote monitoring system 104 can be configured to transmit data to the monitor component 2702 on a periodic basis which can be a predefined period of time, a manually set period of time, or a combination thereof.

The monitor component 2702 can be configured to receive the second data package and utilize such information to identify a geographic location of the tank 300 as well as a condition of the tank 300 or a condition of the contents of the tank 300. The geographic location of the tank 300 can be identified based on the monitor component 2702 evaluating at least the UUID of the wireless remote monitoring system, the timestamp, the UUID of the sensor, and which tank that sensor having the UUID corresponds. Based on the geographic location of the wireless remote monitoring system 104 and the timestamp at which data is received from the sensor 800, the tank location can be determined and parameters thereof can be evaluated and tracked. In an embodiment, a smartphone or electronic device can be used to receive/transmit data (e.g., the first data package, the second data package, or a combination thereof) wirelessly and communicate such data to the monitor component via cellular networks or a Wi-Fi network. In another embodiment, a smartphone or electronic device can be the monitor component 2702 and communicate data to a network or server in real time or after being within a designated Wi-Fi location or network.

By way of example and not limitation, at least one of the first package of data or the second package of data can further include data related to the contents of the tank 300 such as a name, an owner, a geographic location, a service record, a history of personal that have serviced the tank 300, the repairs related to the tank 300, a manufacture date of the tank 300, a type of contents, customized notes from servicing the tank 300, or a combination thereof. It is to be appreciated that the first package of data or the second package of data can be created or appended with data based on information collected from the sensor 800, the wireless remote monitoring system 104, or the monitor component 2702. In still another embodiment, the first package of data or the second package of data can be communicate to or updated by a device through a direct communication.

In another embodiment, the system 2700 can include a first set of gateway devices and a second set of gateway devices, wherein the first set of gateway devices are controlled by a first monitor component and the second set of gateway devices are controlled by a second monitor component. In such embodiment, the first monitor component can be managed by the manufacturer of the tank and the second monitor component can be managed by the service entity that repairs the tank or fills the contents of the thank for the end user.

In an embodiment, the sensor 800 can be situated on a bottom of the tank 300 to collect data related to a weight of the tank 300. The data related to a weight of the tank 300 can be utilized by the system 2700 to identify a fill level of the tank 300 (e.g., empty, low, full, an amount between empty and full). Upon a detection of a weight that meets or approaches a predefined or defined threshold, the monitor component 2702 can communicate a notification that the tank 300 is low on contents and/or request an order for another tank 300. It is to be appreciated that the detection of an empty or low tank 300 can trigger at least one of a notification to an entity to service or fill the tank 300. Further, in an example, the sensor 800 can be a hall effect sensor to detect a volume in the tank 300.

Figure 28:
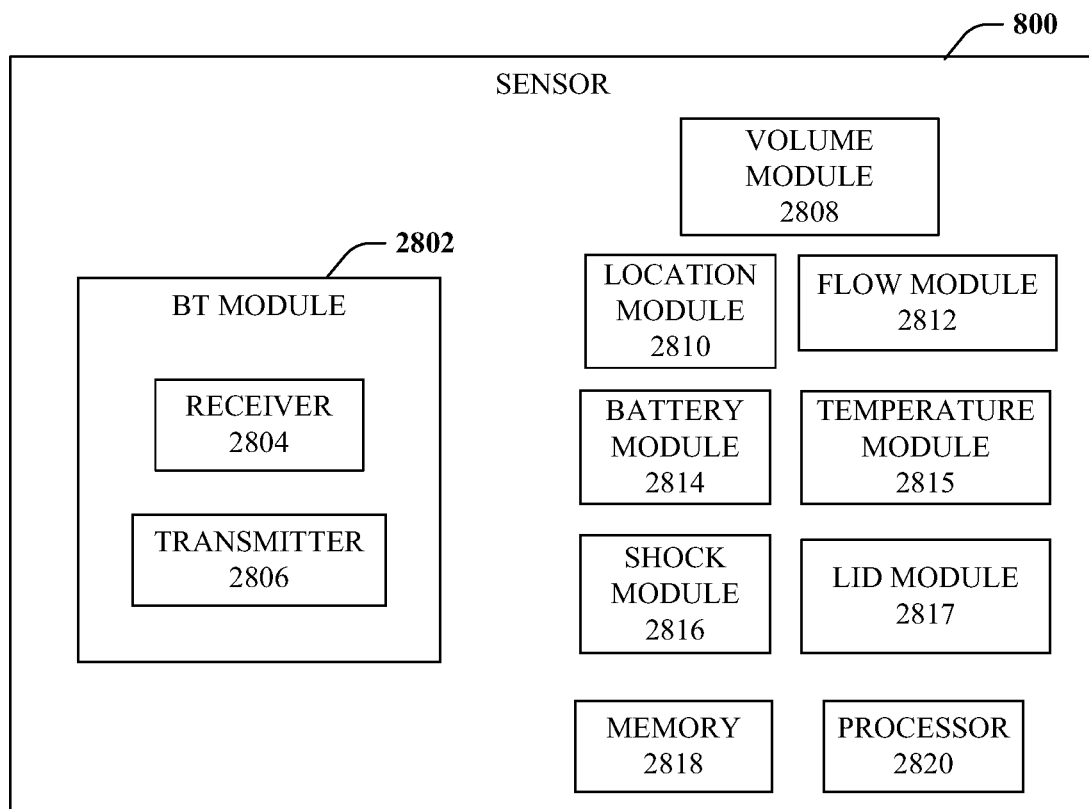
FIG. 28 is an illustration of a sensor.

FIG. 28 illustrates the sensor 800. The sensor 800 can include a BT module 2802 that is configured to wirelessly transmit and/or receive data. The BT module 2802 can include a receiver 2804 and a transmitter 2806. It is to be appreciated that the sensor 800 can utilize a wireless technology to transmit and/or receive data and such wireless technology can be Bluetooth® low energy (BTLE), Bluetooth low power, or a wireless communication technology selected with sound engineering judgment without departing from the scope of the invention. By way of example and not limitation, the wireless communication used with the subject innovation can be Radio Frequency Identification (RFID), Wireless Fidelity (Wi-Fi), ZigBee, Z-Wave, Near Field Communications (NFC), WiMAX, LTE, HSPA, EV-DO, 3G, 4G, satellite, radio, cellular, Infrared (IR), among others. It is to be appreciated that any antenna can be included with the BT module 2802 to receive or send data.

The sensor 800 can include at least a volume module 2808, a location module 2810, a flow module 2812, a batter module 2814, a temperature module 2815, a shock module 2816, a lid module 2817, a memory 2818, and a processor 2820. The sensor 800 can further include a battery or a power source.

The volume module 2808 can include one or more components that can be configured to detect a volume of the contents of the tank 300. The volume module 2808 can track volume of the tank and the history of the levels of contents within the tank for a historic record. Based on the identified level or volume of the tank 300, the volume module 2808 can communicate to the monitor component 2702 in which such amount can be evaluated to determine if the level of the tank 300 is within a range that requires refill.

The location module 2810 can include one or more components that can be configured to collect geographic positioning data of the tank 300 to allow calculation of the tank 300 location or movement thereof. The location module 2810 can utilize global positioning system (GPS) techniques to calculate the geographic location of the sensor 800 and in turn, the tank 300. Further, the location module 2810 can include a range of change for coordinates which would allow detection of movement that is not desired or wanted.

The flow module 2812 can include one or more components that can be configured to collect data related to flow rate of contents into and out of the tank 300. The rate of flow into the tank 300 can be aggregated to ensure safe fill rates for the tank 300. In addition, the rate of flow out of the tank 300 can be detected to ensure the safe exit of contents from the tank 300 as well as facilitate detection of leaks. The flow module 2812 can be utilized to ascertain an amount of contents dispensed from the tank 300 and/or a rate of flow from the tank 300. The flow module 2812 can collect such data and the sensor 800 can communicate the data to the monitor component 2702 (e.g., directly as discussed below or indirectly via the wireless remote monitoring system 104). Based on the received data, the monitor component 2702 can be configured to communicate an alert or notification which would allow a repair, a service, or a replenishment of the contents in the tank 300.

It is to be appreciated that the flow module 2812 can further detect the pressure in the tank 300. Based on a type of contents of the tank 300, the flow module 2812 can include a range or a threshold of acceptable readings for pressure to which the monitor component 2702 can receive and provide notifications or evaluation. In particular, if a threshold is met or exceeded or a reading of pressure is not in a range, the flow module 2812 can communicate to the monitor component 2702 (e.g., directly as discussed below or indirectly via the wireless remote monitoring system 104), and the monitor component 2702 can notify or alert of a repair or adjustment to the tank 300 or the line, tubing, conduit, piping, valves, etc. In an embodiment, if the flow module 2812 detects the pressure of the tank below a predefined pressure within the line, the monitor component 2702 can receive a reading and determine that such predefined pressure indicates a range of approved pressures with the tank 300 or non-approved pressures the tank 300.

The battery module 2814 can include one or more components that can be configured to detect battery life or health of a battery.

The temperature module 2815 can include one or more components that can be configured to detect a temperature for at least one of a contents inside the tank 300, an exterior surface of the tank 300, or an environment in which the tank 300 is located. The temperature module 2815 can include one or more sensing components to aggregate data related to the temperature and store such information prior to transmission to the wireless remote monitoring system 104 or other device (in direct data transfer modes discussed below). The temperature sensing components can be located in at least one of an inside of the tank 300, on an exterior of the tank 300, on an exterior of the tank 300 but having one or more posts that penetrate inside the tank 300, detached from the tank 300 to gather environment temperature, detached from the tank 300 but in electronic communication with the tank 300 to gather environment temperature, a combination thereof, among others.

The shock module 2816 can include one or more components that can be configured to detect or track an amount of impact taken (e.g., shock or force) to the tank 300. A force on the tank 300 can affect a quality of contents and/or a quality of the tank 300. In particular, the tank 300 can include a threshold for the amount of impact or force that is tolerable for the tank. For example, the tank 300 can have a threshold for an amount of force on the tank 300 and if such threshold is met or exceeded, the tank 300 can be replaced or repaired. In another example, if a force (e.g., amount and intensity) for a period of time is met, the tank 300 may require repair or replacement. Such data can be communicated to the monitor component 2702 as discussed above, and such information can be utilized to at least one of retire the tank 300, repair the tank 300, notify use of the tank 300 should be delayed or denied, among others. It is to be appreciated that the monitor component 2702 can leverage stress tests or other experiments on the tank 300 in order to identify the threshold or thresholds for at least one of the repair, retire, or deny or delay use. In another embodiment, the shock module 2816 can track data related to the force or impact during servicing (e.g., repair or filling) of the tank 300 to evaluate service employees (e.g., gentle or rough delivery people). The monitor component 2702 can be configured to identify which tanks 300 were serviced by which people and the shock module data can be correlated to such data, wherein rankings or warnings can be provided to employees.

The lid module 2817 can include one or more components that can be configured to detect or track a position of the lid 102 of the cover system coupled to the tank 300. The lid module 2817 can detect when the lid 102 is open and closed during servicing or any other time to facilitate monitoring efficiency or tampering with the tank 300. In particular, the tank 300 can include a threshold for the amount of time a lid should be opened for servicing or refilling and if that threshold is exceeded, the monitor component 2702 can trigger an alert or notification.

The cover system can further include a display module can include one or more components that can be configured to display or convey data. By way of example, the display module can be an LED, a dot matrix screen, an LCD, a plasma screen, a speaker, a display, a combination thereof, among others. The display module can communicate data (e.g., audibly, visually, haptic feedback, a combination thereof) related to the one or more modules of the sensor 800. For example, if the shock module 2816 detects a force greater than a threshold, the display module can indicate the tank 300 should be rested (e.g., delayed on use) or even repaired or returned. In another example, the display module can communicate an audible alarm upon approach of a threshold related to the temperature module 2815, shock module 2816, flow module 2812, among others. The display module can display images, letters, color, black and white, characters, numbers, graphics, among others. The display module can further communicate audibly with a speaker for example. In another embodiment, the display module can output a haptic feedback.

In another embodiment, the sensor 800 can directly communicate data to a device (e.g., laptop, smartphone, tablet, mobile device, personal computer, portable digital assistant (PDA), a wearable device, among others). For example, the sensor 800 can include a diagnostic and/or data transfer mode in which, upon authentication, the sensor 800 can directly communicate with a device in addition to, or instead of the wireless remote monitoring system 104. For example, a device can be authenticated by the monitor component 2702 by employing an authentication code that can be then communicated by the device to the monitor component 2702. Once a device is verified and authenticated, the device can be configured to receive data from the sensor or the wireless remote monitoring system such as, but not limited to, the first data package or the second data package.

Figure 29:
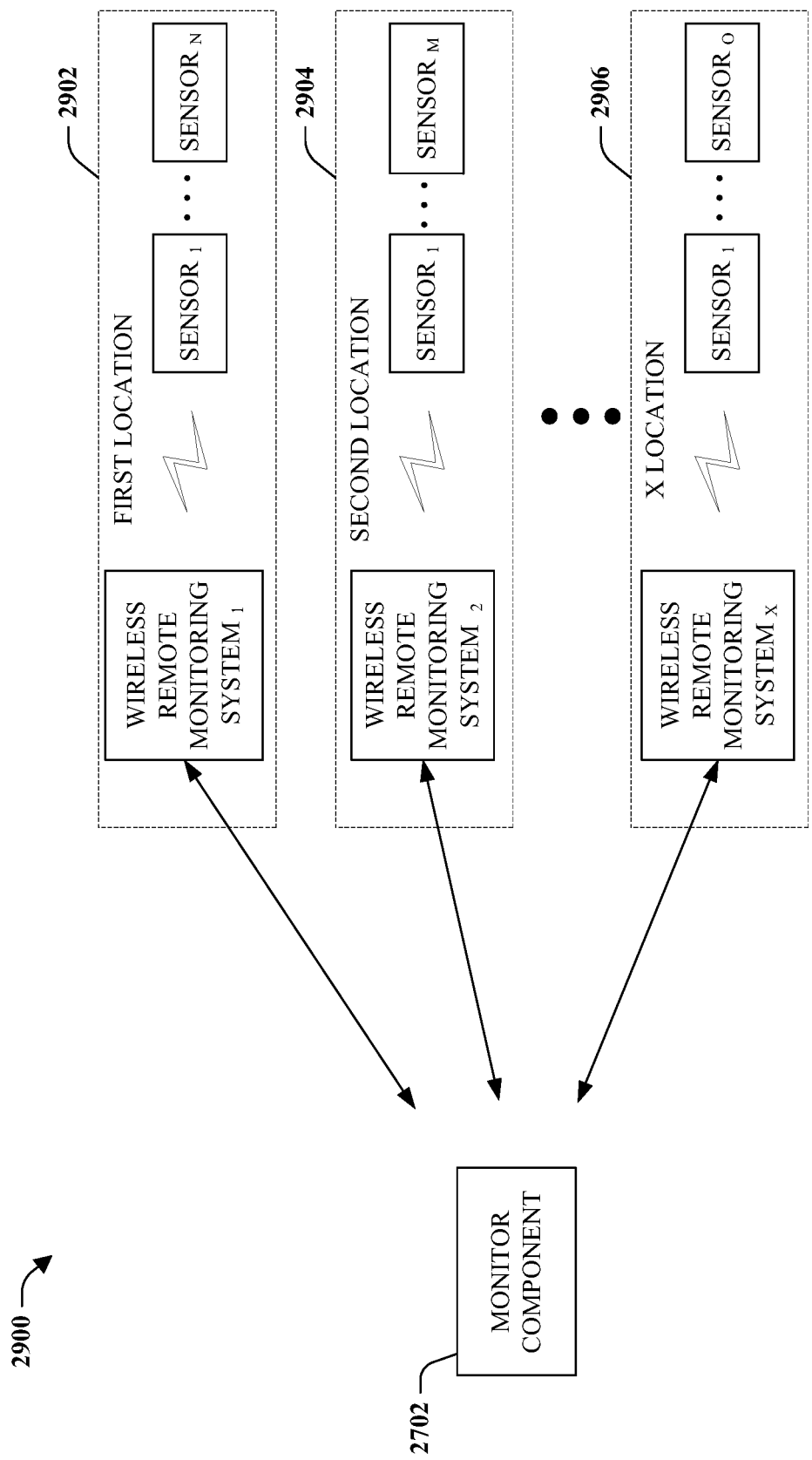
FIG. 29 is a block diagram of data communication at one or more locations in accordance with the subject innovation.

FIG. 29 illustrates a system 300 that illustrates the monitor component 2702 receiving data from one or more locations. In particular, the monitor component 2702 can be a server or a cloud computing platform that communicates with a number of locations, wherein each location has a one or more sensors. Moreover, each location can include one or more wireless remote monitoring systems.

For example, a first location 2902 can include wireless remote monitoring system1 that communicates with a number of sensors such as sensor1 to sensorN, where N is a positive integer. A second location 2904 can include wireless remote monitoring system2 that communicates with a number of sensors such as sensor1 to sensorM, where M is a positive integer. An X location 2906 can include wireless remote monitoring system3 that communicates with a number of sensors such as sensor1 to sensorO, where O is a positive integer. As illustrated there can be a number of locations such as the first location to the X location, where X is a positive integer. The number of sensors at each location can vary due to the number of sensors corresponding to a number of tanks at each location and such number of tanks is changing due to installation, repair, or new construction. The monitor component 2702 can receive data from each location to determine location of each tank, condition of each tank, and/or a condition of the contents of each tank.

Figure 30:
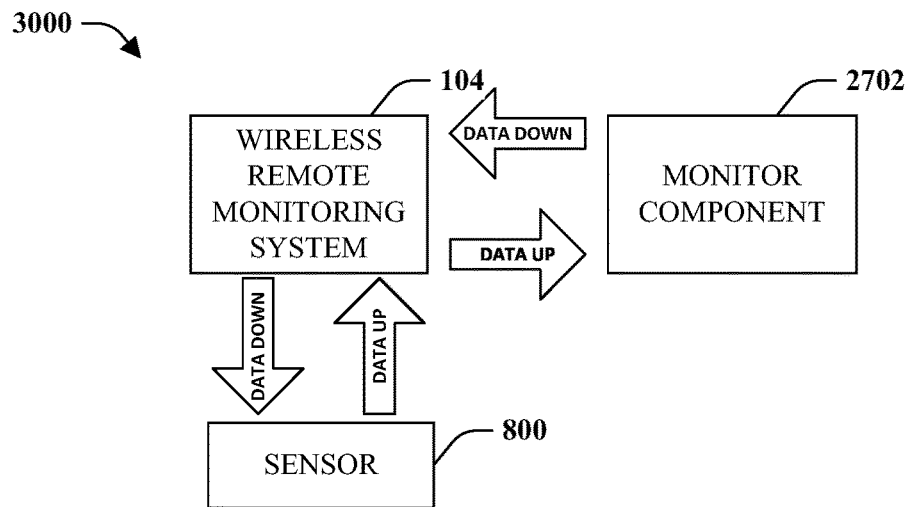
FIG. 30 is an illustration of an embodiment of data communications between one or more sensors with a wireless remote monitoring system to a server at one or more locations.

FIG. 30 illustrates a system 3000 in which data communications between the monitor component 2702, the wireless remote monitoring system 104, and/or the sensor 800 to facilitate identifying a geographic location of a tank and facilitate identifying a condition or parameter of the tank or contents. For instance, the sensor 800 and the wireless remote monitoring system 104 can include a first data communications that includes data such as, but not limited to, the UUID of the sensor and data aggregated from modules of the sensor 800 (also referred to as first data package) in an upstream of data (e.g., from the sensor 800 to the wireless remote monitoring system 104). The wireless remote monitoring system 104 can further communicate an upstream of data (e.g., from the wireless remote monitoring system 104 to the monitor component 2702) to the monitor component 2702 that includes the first package of data and the UUID of the wireless remote monitoring system and a timestamp (also referred to as second data package).

The monitor component 2702 can utilize a downstream of data (e.g., from the monitor component 2702 to the wireless remote monitoring system 104). Between the wireless remote monitoring system 104 and the sensor 800 there can be a downstream of data (e.g., from the wireless remote monitoring system 104 to the sensor 800). For example, recalibrating or calibrating the sensor 800 can require a data push down to the sensor 800 from the monitor component 2702 directly, from the wireless remote monitoring system 104, or a combination thereof. It is to be appreciated that "data up" is referenced in FIG. 30 and corresponds to "upstream of data" and "data down" is referenced in FIG. 30 and corresponds to "downstream of data."

Figure 31:
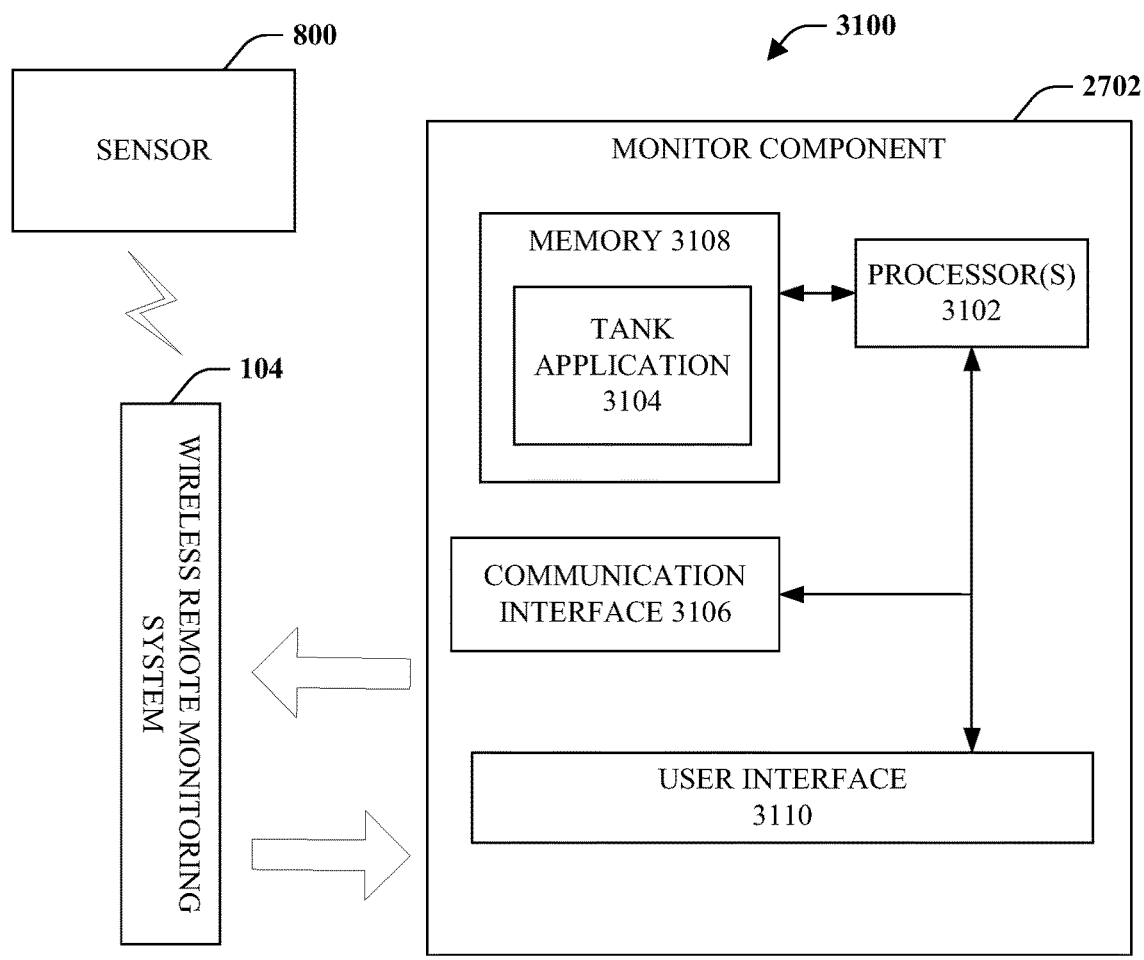
FIG. 31 is block diagram of a system that aggregates information related to a tank based on data collected from a sensor.

Turning to FIG. 31, a system 3100 is illustrated utilizing the monitor component 2702. The monitor component 2702 includes one or more processor(s) 3102 configured to execute computer-executable instructions such as instructions composing tank application 3104. Such computer-executable instructions can be stored on one or more computer-readable media including a non-transitory, computer-readable storage medium such as memory 3108 of monitor component 2702.

The monitor component 2702 includes a communication interface 3106. As shown in FIG. 31, the communication interface 3106 can enable electronic communications with the wireless remote monitoring system 104. It is to be appreciated that the communication interface 3106 can be a wired or wireless interface including, but not limited, a LAN cable, an Ethernet cable, a USB interface, a serial interface, a WiFi interface, a short-range RF interface (Bluetooth), an infrared interface, a near-field communication (NFC) interface, etc.

The monitor component 2702 can further include a user interface 3110 that comprises various elements to obtain user input and to convey user output. For instance, user interface 3110 can comprise a touch display which operates as both an input device and an output device. In addition, user interface 3110 can also include various buttons, switches, keys, etc. by which a user can input information to monitor component 2702, and other displays, LED indicators, etc. by which other information can be output to the user.

In accordance with an embodiment, the monitor component 2702 is a computing device, which can be hosted at a physical location. However, it is to be appreciated that the monitor component 2702 can be other portable form-factors such as a laptop computer, a convertible laptop, a cell phone, a PDA, a pocket computing device, a watch computing device, or the like. Moreover, it is to be appreciated that the functionality described herein with respect to the monitor component 2702 can be performed by a desktop computer, or other larger, less portable computing device. That is, tank application 3104 can be installed and executed on substantially any computing device provided that such a computing device can communicate with the monitor component 2702 as described herein.

It is to be appreciated that the monitor component 2702 can be a network or a portion of a network, wherein the network is at least one of a website, a server, a computer, a cloud-service, a processor and memory, or a computing device connected to the Internet and connected to the wireless remote monitoring system 104. In general, the network can be coupled to one or more devices via wired or wireless connectivity in which data communications are enabled between the network and at least one of a second network, a subnetwork of the network, or a combination thereof. It is to be appreciated that any suitable number of networks can be used with the subject innovation and data communication on networks can be selected by one of sound engineering judgment and/or one skilled in the art.

Figure 32:
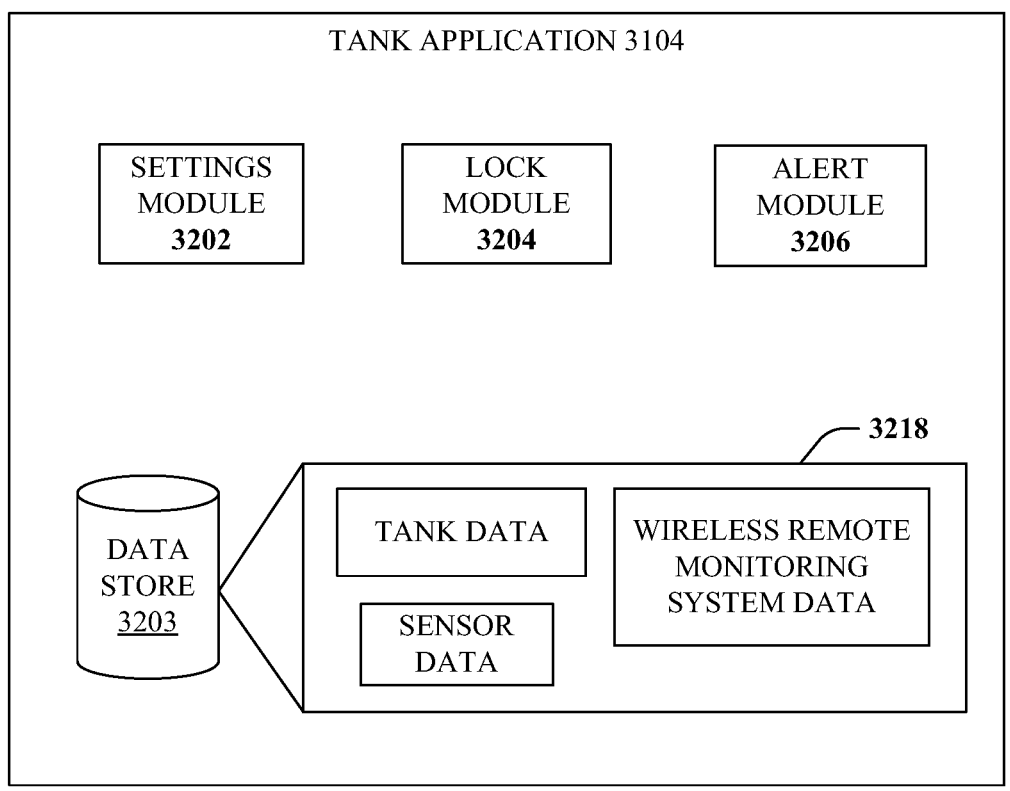
FIG. 32 is a block diagram of an exemplary, non-limiting tank application according to one or more aspects.

FIG. 32 illustrates a block diagram of an exemplary, non-limiting embodiment of the tank application 3104 according to one or more aspects. The tank application 3104 comprises computer-executable instructions and computer-readable data stored on memory 3108 of the monitor component 2702. The computer-executable instructions of tank application 3104 are executable by processor 3102 of the monitor component 2702.

As shown in FIG. 32, the tank application 3104 can include one or more modules (e.g., settings module 3202, lock module 3204, alert module 3206, among others) and data 3218 stored on a data store 3203 that stores data 3218 (e.g., tank data, wireless remote monitoring system data, sensor data, timestamp data, among others). It is to be appreciated that tank data can be, but is not limited to, data related to the condition of the tank, data related to the contents of the tank, data regarding the ownership or type of tank data, data transmitted from a tank, data transmitted to a tank, among others. It is to be appreciated that wireless remote monitoring system data can be, but is not limited to, data related to a location of the wireless remote monitoring system, data collected from the wireless remote monitoring system, data transmitted to the wireless remote monitoring system, among others. It is to be appreciated that the sensor data can be data collected from a sensing or module (for example the modules described in FIG. 28), settings related to the sensor, UUID, data communicated from the sensor to the wireless remote monitoring system, among others. The one or more modules can include computer-executable instructions implementing various features, processes, operations, etc. of the tank application 3104.

The settings module 3202 can include one or more components that can be configured to employ one or more configurations for the tank application 3104. The settings module 3202 can be configured based upon a received instruction. In an embodiment, the settings module 3202 can receive and/or allow adjustment to a range or threshold associated with the sensor 800. In another embodiment, the settings module 3202 can receive instructions on notifications and/or alerts. In particular, if a range is not met for a sensor reading, an alert or notification can be defined. In another example, if a threshold is meet, then an automated response can be implemented. In still another example, the settings module 3202 can be configured to enable the tank application 3104 to send an alert or notification on a schedule or after a period of time for any data collected or tracked. It is to be appreciated that the alert or notification can be a communication (e.g., email, text, automated call, instant message, messaging service, push notification, among others) to an administrator, a service company, a customer, a purchaser, owner of a tank, manufacturer of a tank, third-party servicing a tank, third-party repair company, a combination thereof.

The lock module 3204 can include one or more components that can be configured to allow or deny flow of contents from the tank 300 based on a detected parameter or a received instruction. In an embodiment, a user can communicate an instruction to deny delivery of contents from the tank 300 via a valve. The lock module 3204 can communicate with a solenoid valve or valve controlled via electronics that denies or allows flow of contents. By way of example and not limitation, the flow of contents can be denied, allowed, or restricted based evaluation of data collected from the sensor 800, a user generated instruction, a threshold or range being met or not met for a parameter detected by the sensor 800, a combination thereof, among others. In an example, a lock can be in electrical communication with a wireless remote monitoring system, wherein the wireless remote monitoring system can communicate instructions to open or close the lock. The wireless remote monitoring system in such example can receive instructions from the tank application 3104, the monitor component 2702, and/or a device (via direct communications as discussed).

The alert module 3206 can include one or more components that can be configured to communicate data or notifications. The alert module 3206 can communicate data or notifications (e.g., visual alert, auditory alert, haptic feedback, a combination thereof). The alert module 3206 can communicate a text, a cellular call, a message, a picture message, a group message, an email, an audible signal, a haptic feedback, a light, a post on a social media page, a post on a website, a communication of data to a device or a wearable device, an image, a portion of a graphic, a symbol, a character, a letter, a word, a combination thereof. The alert module 3206 can be configured to communicate data based on a threshold or trigger corresponding to a sensor 800 data collected. In another embodiment, the alert module 3206 can be configured to communicate data based on an electronic instruction from the monitor component 2702, the tank application 3104, or a device (in direct communication based on authentication).

In an embodiment, the alert module 3206 can be configured to communicate a notification upon at least one of a detection of an empty or near empty tank 300, volume of the tank 300, a repair request, a refill request, a payment due date, an expiration date, a force detected on the tank, an amount of pressure, a temperature, an amount in a container, a flow rate, a temperature change, among others. In an embodiment, such notifications can include geographic location data.

Although a single data store 3203 is illustrated, any suitable number of data stores can be used with the system. The number of data stores and the organization where the data is stored there on can be selected with sound engineering judgment and/or by one skilled in the art without departing from the scope of the subject innovation.

It is to be appreciated that any component or module from the tank application 3104 can be a stand-alone component/module, a sub-component, a sub-module, an integrated component with another component, an integrated module within another module, a system, a portion of a system described herein and/or a combination thereof. Thus, the functionality described for the tank application 3104 can be performed by any number of the components or modules discussed.

Figure 33:
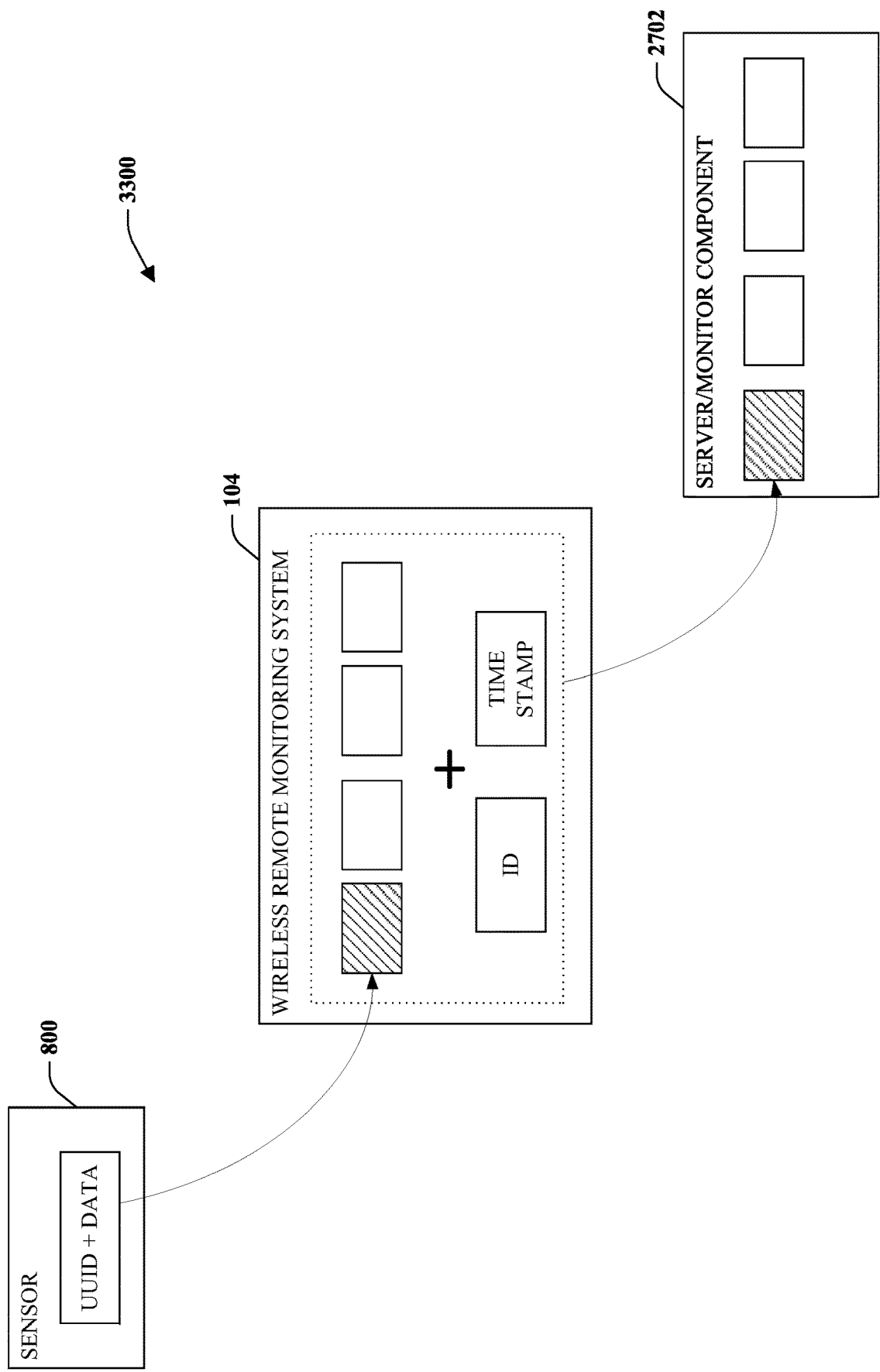
FIG. 33 is a block diagram representing data aggregation in accordance with the subject innovation.

FIG. 33 illustrates data being handled by the monitor component 2702 (also can be referred to as a server), the wireless remote monitoring system 104, and the sensor 800. As illustrated, data from the sensor 800 includes Universal Unique Identification (UUID) and data (e.g., data collected from the sensor such as, but not limited to, flow data, pressure data, volume data, shock data, temperature data, flow data, among others). The UUID and data is communicated to the wireless remote monitoring system 104 when in a range based on use of Bluetooth® low energy communication with the monitor component 2702. In an embodiment, the communication from the sensor 800 to the wireless remote monitoring system 104 is based on a time duration which can be adjusted to manage battery life of the sensor 800. The data communicated from the sensor 800 to the wireless remote monitoring system 104 can also be referred to as a first data package. The wireless remote monitoring system 104 can be configured to collect UUID and data from one or more sensors and include to the data a ID (identification) and a time stamp. This data is communicated from the gateway 104 to the monitor component 2702 (also referred to as a server). The data communicated from the wireless remote monitoring system 104 to the monitor component 2702 can also be referred to as a second data package. The monitor component 2702 can utilize the collected data to analyze and provide insight on the tank 300, the environment of the tank 300, the contents of the tank, the repair or refill of the tank, the location of the tank, volume of the tank 300, shock or impact to the tank 300, temperature of the tank 300, among others In an embodiment, the sensor further detects at least one of an amount of force taken by the tank, a temperature of the tank, or a duration of time for the lid in the closed state. In an embodiment, the housing includes: a top, a bottom opposite thereto, a left side, a right side, a front, and a back; the left side includes a first indent and right side includes a second indent; and the left side includes a bias member and the right side includes a bias member. In an embodiment, the cover system can further include a bracket that is affixed to the bottom face of the lid, the bracket includes a first arm that corresponds to the first indent in shape and a second arm corresponds to the second indent in shape to allow insertion of the housing between the arms and a slide and snap that couples the respective bias member against the respective arms. In an embodiment, the cover system can further include an electronic device that communicates with the transmitter and receiver to collect data from the sensor or communicate data to the wireless remote monitoring system While the embodiments discussed herein have been related to the systems and methods discussed above, these embodiments are intended to be exemplary and are not intended to limit the applicability of these embodiments to only those discussions set forth herein. The embodiments and discussions herein can be readily incorporated into any of these systems and methodologies by those of skill in the art.

The above examples are merely illustrative of several possible embodiments of various aspects of the present innovation, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the innovation. In addition although a particular feature of the innovation may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the innovation, including the best mode, and also to enable one of ordinary skill in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the innovation has been described for purposes of illustrating the best mode known to the applicant at the time and enable one of ordinary skill in the art to practice the innovation, including making and using devices or systems and performing incorporated methods. The examples are illustrative only and not meant to limit the innovation, as measured by the scope and merit of the claims. The innovation has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the innovation is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A cover system for a tank, comprising:
a lid mountable on a corresponding tank, the lid comprising a space sized and shaped for receiving a wireless remote monitoring system therein, wherein the wireless remote monitoring system is operatively coupled to a level sensor for sensing a level of a content contained in the corresponding tank and for generating a corresponding sensor level signal representative of the level of the content contained in the corresponding tank, further wherein the wireless remote monitoring system receives the sensor level signal from the level sensor and generates a corresponding signal wirelessly transmitted to a third party, and
wherein the lid further comprises a locking means for locking the lid to the tank, wherein the locking means includes a biasing means for biasing the locking means towards the tank.

2. The cover system of claim 1, the tank is configured to store at least one of a fluid or a fuel.

3. The cover system of claim 1, the cover system comprises the wireless remote monitoring system.

4. The cover system of claim 1, the wireless remote monitoring system comprises a communication module port adapted for receiving a communication module card therein, further wherein the lid comprises an opening for accessing the communication module port.

5. The cover system of claim 4, the lid further comprises a battery operatively coupled to the wireless remote monitoring system.

6. The cover system of claim 5, the lid further comprises on a top face thereof a solar panel operatively coupled to at least one of the battery or the wireless remote monitoring system.

7. The cover system of claim 1, the lid has an external convex shape and an internal concave shape.

8. The cover system of claim 1, further comprising an attaching means for attaching the lid to the tank.

9. The cover system of claim 8, wherein the attaching means comprises a pivoting means for pivoting the lid relative to the tank.

10. The cover system of claim 9, wherein the pivoting means comprises a hinge.

11. The cover system of claim 1, further comprising a cable for operatively coupling the level sensor to the wireless remote monitoring system.

12. The cover system of claim 1, wherein the lid is made of at least one of plastic, metal, or fiberglass.

13. A cover system for a tank, comprising:
a lid having a shape that includes a top face, a bottom face opposite the top face, and a peripheral side flange extending on a periphery of the lid on the bottom face thereof;
the lid is a mountable on a periphery of a top collar of a tank, wherein the lid attaches to the top collar of the tank, wherein the lid enables an open state and a closed state for the tank, wherein the closed state protects at least one of a valve, a gauge, or a pressure relief valve positioned on a top end of the tank within the top collar;
a housing that includes a top, a bottom opposite thereto, a left side, a right side, a front, and a back, wherein the left side includes a first indent and a first bias member, and the right side includes a second indent and a second bias member; and
a wireless remote monitoring system contained within the housing, the housing releaseably coupled to the bottom face of the lid, the wireless remote monitoring system further includes:
a sensor coupled to the tank or within the tank, the sensor detects at least one of a volume of contents within the tank, a geographic location of the tank, a duration of time for the lid in the open state, and a flow in and out of the tank;
a transmitter that wirelessly communicates the volume of contents within the tank, the geographic location of the tank, the duration of time for the lid in the open state, and the flow in and out of the tank;
a receiver;
a battery that powers at least one of the sensor, the receiver, or the transmitter; and
the housing is positioned above a plane defined by the periphery of the top collar of the tank to facilitate wireless communications.

14. The cover system of claim 13, the sensor further detects at least one of an amount of force taken by the tank, a temperature of the tank, or a duration of time for the lid in the closed state.

15. The cover system of claim 13, further comprising a bracket that is affixed to the bottom face of the lid, the bracket includes a first arm that corresponds to the first indent in shape and a second arm corresponds to the second indent in shape to allow insertion of the housing between the arms and a slide and snap that couples the respective bias member against the respective arms.

16. The cover system of claim 13, further comprising an electronic device that communicates with the transmitter and receiver to collect data from the sensor or communicate data to the wireless remote monitoring system.

17. A cover system, comprising:
a tank having a top end, a bottom end opposite the top, a sidewall in between the top end and the bottom end, the tank configured to hold a volume under a pressure;
a lid having a shape that includes a top face and a bottom face opposite the top face;
a sensor coupled to the tank, the sensor tracks a temperature within the tank, a geographic location of the tank, and a volume of a fluid within the tank;
a wireless remote monitoring system contained within a housing that is releasably coupled to the bottom face of the lid, wherein the wireless remote monitoring system wirelessly receives data from the sensor, the sensor communicates a first data package that includes the temperature and the volume;
the wireless remote monitoring system creates a second data package that includes a time stamp of when the first data package was communicated, an identification of the wireless remote monitoring system, and the first data package; and
a monitor component that is configured to:
receive the second data package;
evaluate the time stamp from the wireless remote monitoring system;

monitor the temperature and the volume;
communicate data to the sensor via the wireless remote monitoring system; and
communicate a notification if at least one of the temperature, and the volume of the tank exceeds a predefined threshold.

18. The cover system of claim 17, wherein the wireless remote monitoring system is releasably coupled to the bottom face of the lid by way of at least one of screws, a snap fitting, or a magnet.

19. The cover system of claim 17, wherein the housing includes a top, a bottom opposite thereto, a left side, a right side, a front, and a back, wherein the left side includes a first indent and a first bias member, and the right side includes a second indent and a second bias member.

20. The cover system of claim 19, further comprising a bracket that is affixed to the bottom face of the lid, the bracket includes a first arm that corresponds to the first indent in shape and a second arm corresponds to the second indent in shape to allow insertion of the housing between the arms and a slide and snap that couples the respective bias member against the respective arms.

\* \* \* \* \*